(12) United States Patent
Di Profio et al.

(10) Patent No.: US 7,103,447 B2
(45) Date of Patent: Sep. 5, 2006

(54) ROBOT APPARATUS, AND BEHAVIOR CONTROLLING METHOD FOR ROBOT APPARATUS

(75) Inventors: Ugo Di Profio, Tokyo (JP); Masahiro Fujita, Saitama (JP); Tsuyoshi Takagi, Saitama (JP); Yukiko Yoshiike, Tokyo (JP); Hideki Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 10/651,577

(22) Filed: Aug. 29, 2003

(65) Prior Publication Data

US 2004/0153212 A1    Aug. 5, 2004

(30) Foreign Application Priority Data

Sep. 2, 2002 (JP) ............................. 2002-257097

(51) Int. Cl.
G06F 19/00 (2006.01)

(52) U.S. Cl. ................... 700/245; 700/247; 700/248; 700/249; 700/250; 700/253; 700/257; 700/262; 318/800; 318/805; 901/1; 901/10; 901/42; 901/46; 340/231; 340/522; 340/565; 340/359.1; 340/359.14; 706/10; 706/13; 706/45

(58) Field of Classification Search ............... 700/245, 700/253, 257, 262, 275, 264, 248, 247, 249, 700/250; 318/800, 805; 29/783, 784; 901/1, 901/42, 10, 46; 340/522, 231, 565, 359.1, 340/359.14; 706/10, 13, 45; 707/204, 205; 711/112, 202, 221

See application file for complete search history.

(56) References Cited

U.S. PATENT DOCUMENTS 6,347,261 B1 *   2/2002   Sakaue et al. .............. 700/245

(Continued)

OTHER PUBLICATIONS

Hirai et al., The development of Honda humanoid robot, IEEE, 1998, p. 1321-1326.*
Lim et al., Waseda biped humanoid robots realizing human-like motion, IEEE, 2000, p. 525-530*

(Continued)

*Primary Examiner*—Thomas G. Black
*Assistant Examiner*—McDieunel Marc
(74) *Attorney, Agent, or Firm*—Frommer Lawrence & Haug LLP; William S. Frommer; Thomas F. Presson

(57) ABSTRACT

A robot (1) is provided which includes a situated behaviors layer (SBL) (58). This SBL (58) is formed in the form of a tree structure in which a plurality of schemata (behavior modules) is connected hierarchically in such a matter that the schemata are highly independent of each other for each of them to behave uniquely. A patent schema can define a pattern in which child schemata are connected, such as an OR type pattern in which the child schemata are caused to behave uniquely, AND type pattern in which the plurality of child schemata are caused to behave simultaneously or a SEQUENCE type pattern indicating a sequence in which the plurality of child schemata should behave, thereby permitting to select a behavior pattern of the robot (1). Also, a new child schema can additionally be included in the SBL (58) without having to rewrite the schemata connection in the tree structure, whereby a new behavior or function can be added to the robot (1). Namely, the plurality of behavior modules permits to enable the robot (1) to show a complicated behavior and have units thereof recombined.

18 Claims, 17 Drawing Sheets

U.S. PATENT DOCUMENTS

| | | | |
|---|---|---|---|
| 6,438,457 B1 * | 8/2002 | Yokoo et al. | 700/245 |
| 6,449,518 B1 * | 9/2002 | Yokoo et al. | 700/86 |
| 6,556,892 B1 * | 4/2003 | Kuroki et al. | 700/245 |
| 6,714,840 B1 * | 3/2004 | Sakaue et al. | 700/245 |
| 6,718,232 B1 * | 4/2004 | Fujita et al. | 700/245 |
| 6,850,818 B1 * | 2/2005 | Sabe et al. | 700/257 |

OTHER PUBLICATIONS

Hashimoto, Vision system for humanoid robot—Toward emotinal man-machine-environment interaction, IEEE, p. 269.*

Sardain et al., An anthropomorphic biped robot: Dynamic concepts and technological design, 1998, IEEE, p. 823-838.*

* cited by examiner

_US 7,103,447 B2_

ROBOT APPARATUS, AND BEHAVIOR CONTROLLING METHOD FOR ROBOT APPARATUS

BACKGROUND OF THE INVENTION

1. Field of the Invention

The present invention generally relates to a robot apparatus which can behave autonomously to have realistic communications with the user and a method of controlling the behavior of the robot apparatus, and more particularly to an autonomous robot apparatus which can recognize surroundings thereof including images and sounds and behave itself in response to such conditions, and a behavior control method for the robot apparatus.

This application claims the priority of the Japanese Patent Application No. 2002-257097 filed on Sep. 2, 2002, the entirety of which is incorporated by reference herein.

2. Description of the Related Art

A machine or device capable of performing like a human being (animal) by electrical or magnetic operations is called "robot". In Japan, the robots had started prevailing in the late 1960s. Many of the robots were industrial robots such as manipulators, transport robots and the like intended for automation, unmanning, etc. of the factory production lines.

Recently, there have been developed utility robots which support the human life as a partner of the human being, that is, support the human activities in the residential environment and other daily living situations. Different from the industrial robots, the utility robots have abilities of autonomically learning how to adapt themselves to human beings different in personality from each other in various aspects of the human beings' living environments or to various environments or to various environments. There are being put to practical use the "pet" robots simulating the physical mechanism and behaviors (motions or actions) of a quadrupedal walking animal such as a dog or cat and the "humanoid" robots designed based on the physical mechanism and behaviors of the human being or the like walking on two feet, for example.

Since the above "pet" and "humanoid" robots can perform various behaviors designed with major consideration to the entertainment as compared with the industrial robots, they are often called "entertainment robots". Some of the entertainment robots autonomously behave adaptively to external information and internal status.

Generally, the robot of such an autonomous type selects a sequence of behaviors correspondingly to change in environments including images and sounds. Also, some of the autonomous robots have other behavior selection mechanisms which models emotions such as instinct and feeling for managing the internal status of the system and selecting a behavior correspondingly to a change of the internal status. It should be noted that the system internal status is changed as the environment changes and also when the robot does the selected behavior.

Since a robot has to be designed with considerations given to resources such as a hardware and software and required behavior of the robot, many of behavior modules are implemented on demand.

Actually, a behavior as a whole can be implemented monolithically, that is, by one software module. To implement a more complicated behavior, however, a behavior may be modularized, namely, it may be decomposed into a plurality of modules to implement the behavior by interactions among the modules.

However, when any one of the modules is used to implement another behavior, the procedure of interaction between the modules and the modules themselves have to radically be rewritten for that purpose in some cases. The modules are difficult to recombine.

OBJECT AND SUMMARY OF THE INVENTION

It is therefore an object of the present invention to overcome the above-mentioned drawbacks of the related art by providing a robot apparatus capable of implementing a complicated behavior by a plurality of behavior modules and in which modules can easily be recombined, and a behavior control method for the robot apparatus.

The above object can be attained by providing a robot apparatus comprising:

means for recognizing the environment around the robot apparatus;

means for managing an internal status of the robot apparatus according to the recognized environment and/or a behavior of the robot apparatus; and a plurality of performing means for performing behaviors of the robot apparatus according to the environment and/or internal status, each of the behaviors being performed respectively, wherein the plurality of performing means are constructed by tree-structure according to levels of the behaviors of the robot apparatus, and lower-order ones of the performing means in the tree-structure perform behaviors of the robot apparatus based on behavior information which is set by higher-order ones of the performing means in the tree-structure where the lower-order ones of the performing means are connected.

The "behavior information" referred to herein includes information about targets of the behaviors and what the behaviors are.

Also the above object can be attained by providing a robot apparatus comprising:

means for recognizing the environment around the robot apparatus;

means for managing an internal status of the robot apparatus according to the recognized environment and/or a behavior of the robot apparatus; and a plurality of performing means for performing behaviors of the robot apparatus according to the environment and/or internal status, each of the behaviors being performed respectively, wherein the plurality of performing means are constructed by tree-structure according to levels of the behaviors of the robot apparatus, higher-order ones of the performing means in the tree-structure are able to set a connection pattern of lower-order ones of the performing means in the tree-structure, and the lower-order ones of the performing means perform behaviors according to the connection pattern.

As the "connection pattern", there is available a one indicating a behavior sequence of the plurality of lower-order ones of the performing means, a one indicating that the plurality of lower-order ones of the performing means are caused to move simultaneously or a one indicating that each of the lower-order ones of the performing means performs behaviors respectively.

In the above robot apparatus, the performing means which respectively perform behaviors, are highly independent of each other, and the performing means perform behaviors based on behavior information which is set by higher-order ones of the performing means. Also, higher-order ones of the performing means are able to set a connection pattern of lower-order ones of the performing means, and the lower-order ones of the performing means perform behaviors according to the connection pattern.

Also the above object can be attained by providing a behavior controlling method for a robot apparatus, wherein the method comprising a plurality of performing modules for performing behaviors of the robot apparatus respectively according to recognized environment around the robot apparatus, and/or an internal status of the robot apparatus according to the recognized environment and/or a behavior of the robot apparatus, the plurality of performing modules are constructed by tree-structure according to levels of the behaviors of the robot apparatus, and lower-order ones of the performing modules in the tree-structure perform behaviors of the robot apparatus based on behavior information which is set by higher-order ones of the performing modules in the tree-structure where the lower-order ones of the performing modules are connected.

The "behavior information" referred to herein includes information about targets of the behaviors and what the behaviors are.

Also the above object can be attained by providing a behavior controlling method for a robot apparatus, wherein the method comprising a plurality of performing modules for performing behaviors of the robot apparatus respectively according to recognized environment around the robot apparatus, and/or an internal status of the robot apparatus according to the recognized environment and/or a behavior of the robot apparatus, the plurality of performing modules are constructed by tree-structure according to levels of the behaviors of the robot apparatus, higher-order ones of the performing modules in the tree-structure are able to set a connection pattern of lower-order ones of the performing modules in the tree-structure, and the lower-order ones of the performing modules perform behaviors according to the connection pattern.

As the "connection pattern", there is available a one indicating a behavior sequence of the plurality of lower-order ones of the performing modules, a one indicating that the plurality of lower-order ones of the performing modules are caused to move simultaneously or a one indicating that each of the lower-order ones of the performing modules performs behaviors respectively.

In the above behavior controlling method for a robot apparatus, the performing modules which respectively perform behaviors, are highly independent of each other, and the performing modules perform behaviors based on behavior information which is set by higher-order ones of the performing modules. Also, higher-order ones of the performing modules are able to set a connection pattern of lower-order ones of the performing modules, and the lower-order ones of the performing modules perform behaviors according to the connection pattern.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

An embodiment of the present invention will be described in detail below with reference to the accompanying drawings.

The embodiment of the present invention is a bipedal walking robot. This robot is a utility robot which can help the human activities in various living environments and various phases of daily life, and it is also an entertainment robot capable of behaving adaptively to an internal status (anger, sadness, joy, happiness, etc.) and also performing the basic behaviors (motions or actions) of a human being.

Figure 1:
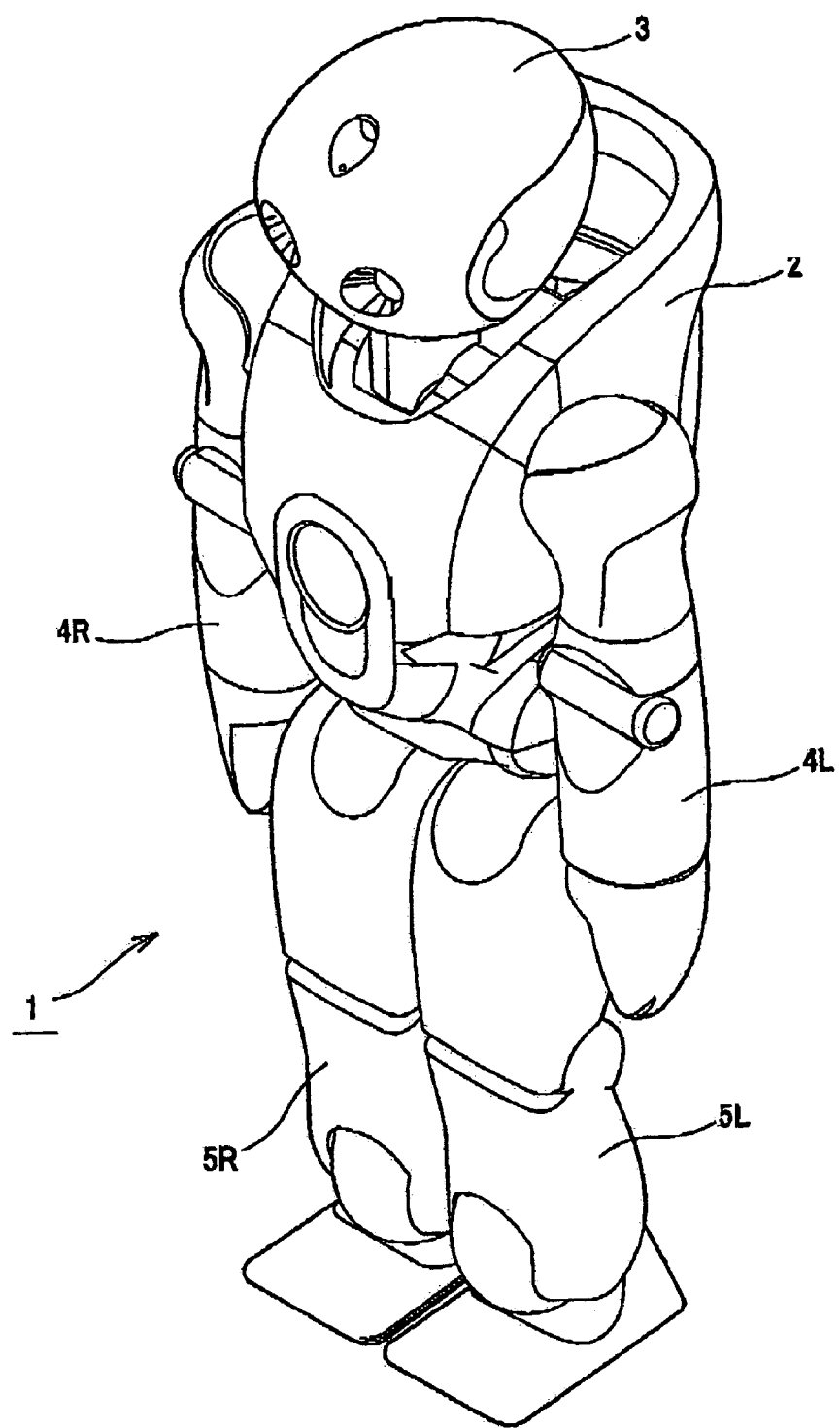
FIG. 1 is a perspective view of the robot apparatus according to the present invention, showing the appearance and construction of the robot apparatus.

Referring now to FIG. 1, the bipedal walking robot according to the present invention is schematically illustrated in the form of a perspective view. As shown, the robot, generally indicated with a reference 1, consists of a body unit 2, head unit 3, two arm units, right and left, 4R and 4L and two leg units, right and left, 5R and 5L. The head unit 3 is coupled in place to the body unit 2, and the arm units 4R and 4L and leg units 5R and 5L are coupled in place to the body unit 2. It should be noted that the "R" and "L" stand for "right" and "L", respectively, and so the arm units 4R and 4L, for example, will be referred to as "arm units 4R/L" hereunder wherever appropriate.

Figure 2:
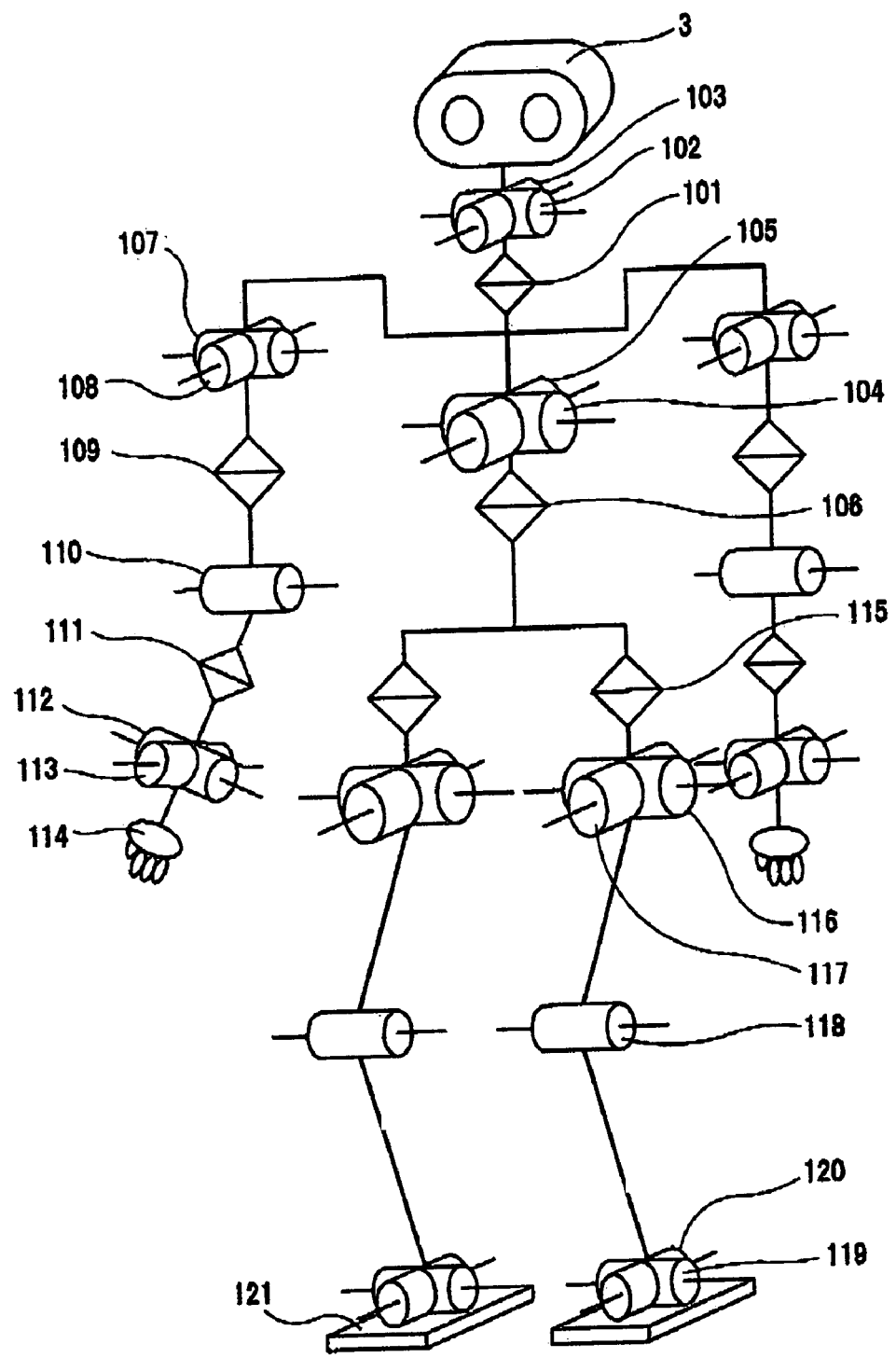
FIG. 2 schematically illustrates a degree-of-freedom construction model of the robot apparatus shown in FIG. 1.

The robot 1 has degrees of freedom as schematically illustrated in FIG. 2. The neck unit 3 has three degrees of freedom including a neck joint yaw axis 101, neck joint pitch axis 102 and a neck joint roll axis 103.

Each of the arm units 4R/L forming the upper limbs has a should joint pitch axis 107, shoulder joint roll axis 108, upper arm yaw axis 109, elbow joint pitch shaft 110, lower arm yaw axis 111, wrist joint pitch axis 112, wrist joint roll axis 113 and a hand 114. The hand 114 is actually a multi-joint, multi-degrees-of-freedom structure including a plurality of fingers. Since any behavior of the hand 114 is less contributed to, or less influences, the control of the posture and walking of the robot 1, however, the hand 114 is assumed herein to have no degree of freedom. Therefore, each of the arm units 4R/L has seven degrees of freedom.

Also, the body unit 2 three degrees of freedom including a body pitch axis 104, body roll axis 105 and a body yaw axis 106.

Each of the leg units 5R/L forming the lower limbs has a hip joint yaw axis 115, hip joint pitch axis 116, hip joint roll axis 117, knee joint pitch axis 118, ankle joint pitch axis 119, ankle joint roll axis 120 and a foot 121. It is assumed herein that the intersection between the hip joint pitch axis 116 and hip joint roll axis 117 defines the hip joint position of the robot 1. It should be noted that although the foot 121 of the human being is actually a structure including a sole having multiple joints and multiple degrees of freedom, the foot sole of the robot 1 is assumed herein to have no degree of freedom. Therefore, each of the leg-units 5R/L has six degrees of freedom.

Namely, the robot 1 has a total of thirty two degrees of freedom (=3+7×2+3+6×2). However, the entertainment robot 1 is not always limited to the thirty two degrees of freedom. Depending upon the constraints in designing and manufacture and required specifications, the number of degrees of freedom, that is, joints, may of course be increased or decreased appropriately.

Each of the above degrees of freedom the robot 1 has is actually implemented by an actuator. The actuator should desirably be small and lightweight to meet the requirements that the robot 1 should be formed to have a shape near the human being's natural shape with as less excessive bulging-out as possible and the posture of the bipedal walking robot as an unstable structure should be well controllable.

Figure 3:
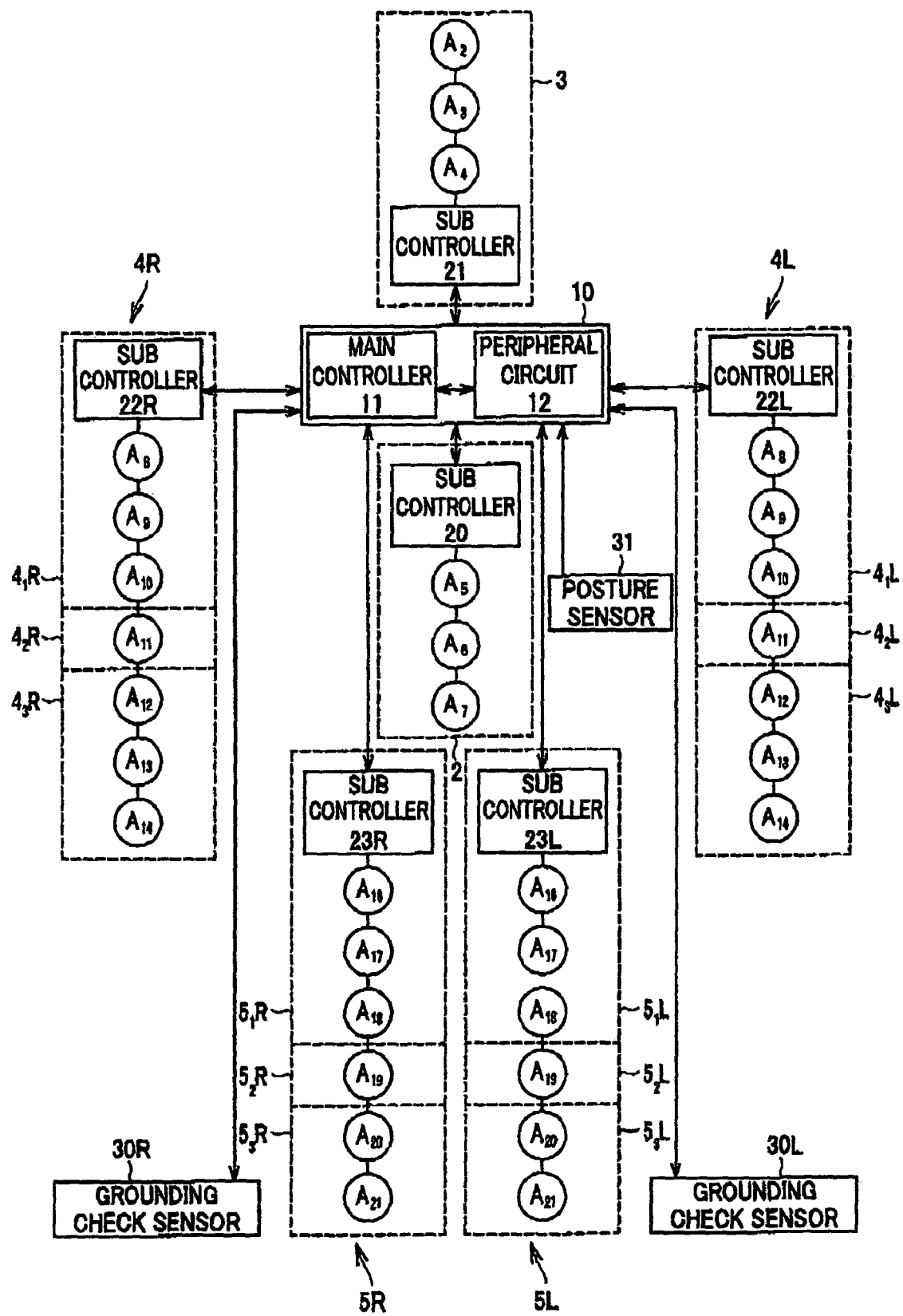
FIG. 3 is a block diagram of the robot apparatus.

FIG. 3 schematically illustrates a control system included in the robot 1. As shown, the robot 1 includes the body unit 2, head unit 3 and the arm units 4R/L and leg units 5R/L as the four limbs of a human being, and a control unit 10 which provides an adaptive control for coordinating behaviors of the bodily units.

The control unit 10 makes centralized control over the behaviors of the robot 1 as a whole. The control unit 10 is composed of a main controller 111 including main circuit components such as a CPU (central processing unit), DRAM, flash ROM, etc., and a peripheral circuit 12 including a power circuit; interfaces (not shown) for transfer of data and commands to and from various components of the robot 1, etc.

The control unit 10 may not be installed in any limited location. Although the control unit 10 is installed in the body unit 2 as shown in FIG. 3, it may be installed in the head unit 3. Alternatively, the control unit 10 may be disposed outside the robot 1 in such a manner that it can make cable or wireless communications with the robot 1.

Each of the degrees of freedom in the robot 1, shown in FIG. 2, is implemented by an actuator. That is, the head unit 3 has a neck joint yaw-axis actuator $A_2$, neck joint pitch-axis actuator $A_3$ and a neck joint roll-axis actuator $A_4$ for the neck joint yaw axis 101, neck joint pitch axis 102 and neck joint roll axis 103, respectively.

In addition, the head unit 3 is provided with a CCD (charge-coupled device) camera to capture external situations, a distance sensor to measure the distance to an object existing in front of the robot 1, a microphone to collect external sounds, a speaker to provide output sounds, a touch sensor to detect a pressure applied due to an physical action such as "patting" or "hitting" by the user, etc.

The body unit 2 has a body pitch-axis actuator $A_5$, body roll-axis actuator. $A_6$ and a body yaw-axis actuator $A_7$ for the body pitch axis 104, body roll axis 105 and body yaw axis 106, respectively. Also, the body unit 2 has installed therein a battery which supplies a power to the robot 1. The battery is a rechargeable one.

The arm units 4R/L are composed of upper arm units $4_1$R/L, elbow joint units $4_2$R/L and a lower arm units $4_3$R/L, respectively, and each of the upper arm units 4R/L has a shoulder joint pitch-axis actuator $A_8$, shoulder joint roll-axis actuator $A_9$, upper arm yaw-axis actuator $A_{10}$, elbow joint pitch-axis actuator $A_{11}$, elbow joint roll-axis actuator $A_{12}$, wrist joint pitch-axis actuator $A_{13}$ and a wrist joint roll-axis actuator $A_{14}$ for the shoulder joint pitch axis 107, shoulder joint roll axis 108, upper arm yaw axis 109, elbow joint pitch shaft 110, lower arm yaw axis 111, wrist joint pitch axis 112 and wrist joint roll axis 113, respectively.

The leg units 5R/L are composed of femoral units $5_1$R/L, knee units $5_2$R/L and tibial units $5_3$R/L, respectively, and each of the leg units 5R/L has a hip joint yaw-axis actuator $A_{16}$, hip joint roll-axis actuator $A_{17}$, hip-joint roll-axis actuator $A_{18}$, knee joint pitch-axis actuator $A_{19}$, ankle joint pitch-axis actuator $A_{20}$ and an ankle joint roll-actuator $A_{21}$ for the hip joint yaw axis 115, hip joint pitch axis 116, hip joint roll axis 117, knee joint pitch axis 118, ankle joint pitch axis 119 and ankle joint roll axis 120, respectively. Each of the actuators $A_2$, $A_3$, . . . used for the joints should preferably be formable from a small AC servo actuator connectable directly to a gear, having a servo control system formed as a single chip, and built in a motor unit.

The component units such as the body unit 2, head unit 3, arm units 4R/L and leg units 5R/L are provided with sub controllers 20, 21, 22R/L and 23R/L, respectively, to drive and control the corresponding actuators. Further, the leg units 5R/L are provided with grounding check sensors 30R/L, and the body unit 2 has installed therein a posture sensor 31 to measure the posture of the robot 1.

The grounding check sensor 30R/L is formed from a proximity sensor or microswitch provided on the foot sole. The posture sensor 31 is formed from a combination of an acceleration sensor and gyro sensor.

Outputs from the grounding check sensors 30R/L show whether each of the right and left feet of the robot 1 walking or running is currently on or off the ground. Also, an output from the posture sensor 31 shows an inclination or posture of the body unit of the robot 1.

In response to the outputs from the sensors 30R/L and 31, the main controller 11 can correct a controlled target dynamically. More specifically, the main controller 11 makes an adaptive control of the sub controllers 20, 21, 22R/L and 23R/L to provide a whole-body behavior pattern in which the upper limbs, body and lower limbs of the robot 1 are coordinately driven.

That is, the main controller 11 in the robot 1 sets a foot behavior, zero moment point (ZMP) orbit, body behavior, upper-limb behavior, waist height, etc. set for a whole-body behavior, generates commands for operations of the actuators are generated correspondingly to the settings and transfer the commands to the sub controllers 20, 21, 22R/L and 23R/L. The sub controllers 20, 21, . . . interpret the commands received from the main controller 11 and provide a drive/control signal to each of the actuators $A_2, A_3$ . . . . The term "ZMP" refers to a point on the flow where the moment caused by the floor reaction force during walking of the robot 1 is zero, and the term "ZMP orbit" is an orbit along which ZMP moves during walking of the robot 1, for example. It should be noted that the concept of ZMP and application of ZMP to the stability criterion of walking robots are referred to the "Legged Locomotion Robots" by Miomir Vukobratovic.

As above, in the robot 1, the sub controllers 20, 21, . . . interpret commands received from the main controller 11, and provide a drive/control signal to each of the actuators $A_2, A_3$, . . . to control of the operation of each unit. Thus, the robot 1 can shift to a target posture stably and walk in a stable posture.

The control unit 10 of the robot 1 controls the posture as above, makes centralized processing of video information from various sensors including the acceleration sensor, touch sensor, grounding check sensor, etc. and CCD camera and audio information etc. from the microphone. The control unit 10 is connected to the main controller 11 via hubs (not shown) various sensors such as the acceleration sensor, gyro sensor, touch sensor, distance sensor, microphone, speaker, etc., actuators, CCD camera and the battery correspond to.

The main controller 11 sequentially acquires sensor data supplied from the aforementioned sensors, video data and audio data, and stores these data into place in a DRAM via an internal interface. Also, the main controller 11 is sequentially supplied with data on battery's residual potential from the battery and stores into place in the DRAM. The sensor data, video data and audio data, battery's residual potential data, stored in the DRAM, are utilized by the main controller 11 in controlling the behaviors of the robot 1.

In the initial status after the robot 1 is turned on, the main controller 11 reads a control program and stores it into the DRAM. Also, the main controller 11 measures, based on the sensor data, video and audio data, battery's residual potential data sequentially stored in the DRAM from the main controller 11, the internal and external statuses and whether the user has given an instruction to, or has acted on, the robot 1.

Further, the main controller 11 selects a behavior depending upon its internal status according to the result of judgement and the control program stored in the DRAM, and causes the robot 1 to make a "gesture" by driving corresponding actuators correspondingly to the selected behavior.

Figure 4:
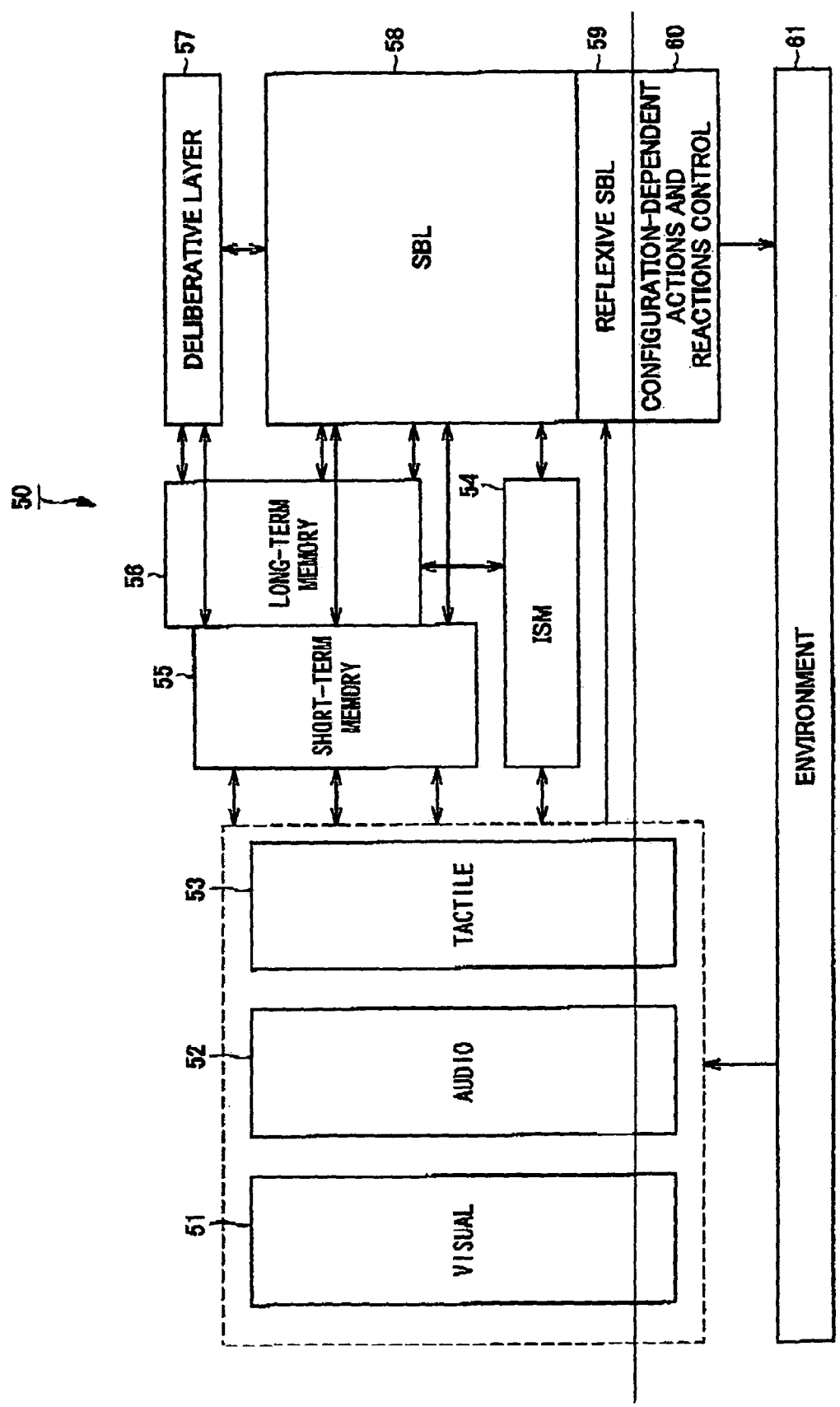
FIG. 4 shows a basic architecture of the behavior control system included in the robot apparatus to control behaviors of the robot apparatus.

As above, the robot 1 can control its behavior adaptively to the result of recognition of any external stimulus and internal status under the control program. FIG. 4 schematically illustrates the basic architecture of a behavior control system 50 adopted in the robot 1.

The behavior control system 50 illustrated can employ an object-oriented programming. In this case, each software is handled as a module unit called "object" being an integration of data (property) and a procedure (method) for processing the data. Each object permits to transfer the property and take over the method by a message communication and an inter-object communication using a common memory.

To recognize an environment 61, the behavior control system 50 includes a visual recognition block (Video) 51, audio recognition block (Audio) 52 and a tactile recognition block 53.

The visual recognition block (Video) 51 makes image recognitions such as facial recognition and color recognition on the basis of a captured image supplied via an image input unit such as a CCD and extracts features of the image. The visual recognition block 51 is composed of a plurality of objects such as "Multi-Color Tracker", "Face Detector" and "Face Identify" which will further be described later.

The audio recognition block (Audio) 52 recognizes audio data supplied via an audio input unit such as a microphone, extracts features of the audio data, and recognizes a set of words (text). The audio recognition block 52 is composed of a plurality of objects such as "Audio Recog" and "Speech Recog" which will further be described later.

The tactile recognition block (Tactile) 53 receives touch sensor from the touch sensor built in the head unit or the like to recognize an external stimulus such as "being patted" or "being hit".

The internal-status manager (ISM) 54 has an instinct model and emotion model, which manage the internal status such as instinct and emotion of the robot 1 correspondingly to external stimuli (ES) recognized by the aforementioned visual recognition block 51, audio recognition block 52 and tactile recognition block 53.

The emotion model and instinct model are supplied with the result of each recognition and a record of behaviors and manage the values of emotion and instinct. The behavior model can refer to the values of emotion and instinct.

The short-term memory 55 is a functional module to hold, for a short term, a target and event recognized in the environment by the visual, audio and tactile recognition blocks 51, 52 and 53. It stores an image supplied from the CCD camera for a short term of about 15 seconds, for example.

The long-term memory 56 is used to hold, for a long term, information acquired through learning such as the name of a thing. The long-term memory 56 memorizes an internal-status change associatively with an external stimulus applied to a behavior module, for example.

The behaviors of the robot 1 include mainly "reflexive behavior" implemented by a reflexive SBL 59, "situated behavior" implemented by a situated behaviors layer (SBL) 58 and "deliberative behavior" implemented by a deliberative layer 57.

The deliberative layer 57 makes a long-term plan of behaviors of the robot 1 on the basis of the stored contents of the short- and long-term memories 55 and 56.

A deliberative behavior is to be done by inference and scheming for realization of the inference according to a given situation or user's instruction. Since the inference and scheming take a longer time for processing and computation than the time of reaction for maintaining the interaction between the robot 1 and user, so the robot 1 infers and schemes the realization of the inference by making reflexive and situated behaviors on the real-time basis while making responsive reactions.

The situated behaviors layer (SBL) 58 controls a behavior responsive to a situation of the robot 1 on the basis of the contents stored in the short- and long-term memories 55 and 56 and internal status managed by the internal-status manager (ISM) 54.

The situated behaviors layer 58 has a state machine for each of behaviors, and categorizes the results of recognition of external information supplied from the sensors according to the previous behaviors and situations to have the robot 1 show a behavior. Also, the situated behaviors layer 58 implements a behavior intended to hold the internal status within a certain range (also called "homeostasis behavior"). If the internal status exceeds a designated range, the situated behaviors layer 58 activates the behavior of the robot 1 so that a behavior to return the internal status to within the range will easily take place (actually, it selects a behavior with consideration given to both the internal status and external stimuli). The situated behavior takes a long time in response than the reflexive behavior as will be described later.

The reflexive SBL (situated behaviors layer) 59 is a functional module to have the robot 1 behave reflexively to an external stimulus recognized by the aforementioned visual, audio and tactile recognition blocks 51, 52 and 53.

Basically, the reflexive behavior is supplied directly with results of recognition of external stimuli supplied from the sensors, and categorizes the information to select an output behavior directly. For example, a behavior to instantly evade a obstacle detected should desirably be implemented as a reflexive behavior.

In the robot 1 according to the present invention, the short-term memory 55 consolidates the results of recognition from the visual, audio and tactile recognition blocks 51, 52 and 53 for temporal and spatial consistency among the perceptions and supplies the perceptions of each object in the environment as short-term memories to the situated behaviors layer (SBL) 58 and the like. Also, the short-term memory 55 supplies the result of recognition of external stimulus information supplied from the sensors directly to the reflexive SBL 59.

Generally, if the robot 1 is controlled by only the situated behaviors layer (SBL) 58 and deliberative SBL 57, selecting a behavior taking various conditions in consideration, it will show a slower response to any stimuli slowly. On this account, the behavior control system 50 of the robot 1 is constructed according to the present invention for the situated behaviors layer (SBL) 58, deliberative SBL 57 and the reflexive SBL 59 which decides to implement a behavior under a single sensor condition to go through separate processes in order to decide implementation of a behavior taking various conditions (internal status and external stimuli) in consideration.

Note that the aforementioned deliberative SBL 57, situated behaviors layer (SBL) 58 and reflexive SBL 59 can be stated as higher-order application programs independent upon the hardware configuration of the robot 1. The configuration-dependent actions and reactions controller 60 controls directly the hardware of the robot 1 for driving the aforementioned actuators $A_2, A_3, \ldots$ according to instructions from the higher-order applications (behavior modules called "schema") for changing environment around the robot 1.

Figure 5:
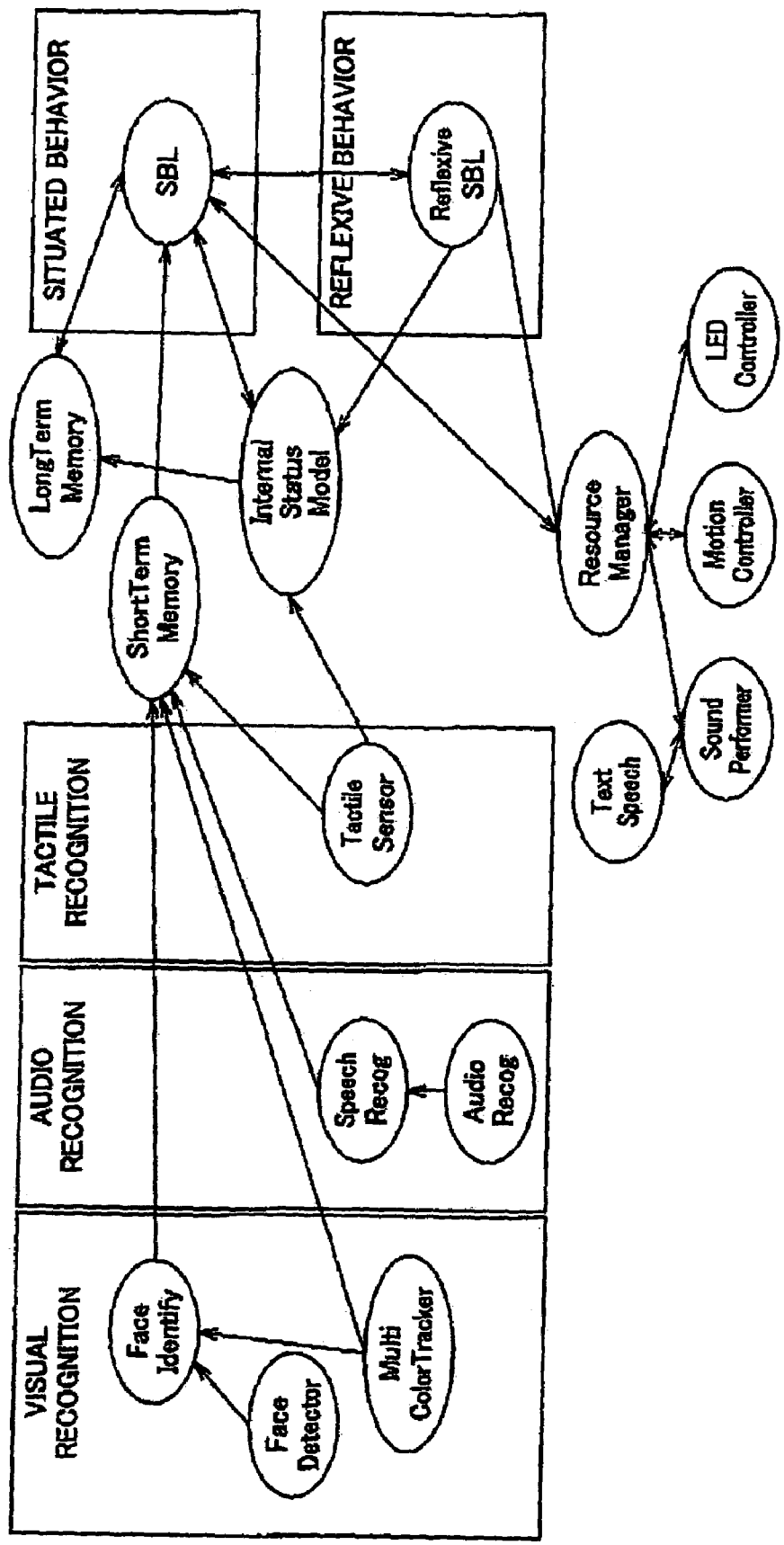
FIG. 5 schematically illustrates objects of the behavior control system.

Each of the functional modules in the behavior control system 50 of the robot 1 as shown in FIG. 4 is constructed as an object. Each object transfers data (property) and inherit a program (method) having behavior of a thing stated therein by a message communication and an inter-object communication using a common memory. Each object will be explained will be described herebelow with reference to FIG. 5 showing an object construction in the behavior control system 50.

The visual recognition block 51 is composed of three objects "Face Detector", "Multi-color Tracker" and "Face Identify". The Face Detector is an object which detects the face area in an image frame and outputs the result of recognition to the Face Identify object. The Multi-color Tracker is an object which recognizes a color and outputs the result of recognition to the Face Identify and Short-term Memory (an object included in the short-term memory 55) objects. The Face Identify is an object which identifies a person by searching an on-hand dictionary for a detected face image and outputs ID information about the person along with information about the position and size of the face image area to the Short-term Memory object.

The audio recognition block 52 is composed of two objects "Audio Recog" and "Speech Recog". The Audio Recog is an object which receives audio (speech) data from the audio input unit such as a microphone, extracts a feature of the audio data and detects a speech section. It outputs a feature amount of the audio data in the speech section and direction of sound source to the Speech Recog and Short-term Memory objects. The Speech Recog is an object which recognizes a speech using the audio feature supplied from the Audio Recog object and a speech and syntax dictionaries and outputs a set of recognized words to the Short-term Memory object.

The tactile recognition block 53 includes an object called "Tactile Sensor" which recognizes an input from the touch sensor and outputs the result of recognition to the Short-term Memory object and an Internal-status Manager (ISM) object which manages the internal status.

The Short-term Memory (STM) is an object included in the short-term memory 55. It is a functional module to hold, for a short term, a target and event recognized in the environment by each object in the aforementioned recognition system (for example, storing an input image from the CCD for a short term of about 15 seconds). It periodically gives a notification of an external stimulus to a Situated Behaviors Layer (SBL) as an STM client.

The objects in the behavior control system 50 includes a Long-term Memory (LTM). The Long-term Memory (LTM) is an object included in the long-term memory 56, and it is used to hold, for a long term, information acquired through learning such as the name of a thing and the like. The Long-term Memory can associatively store a change of the internal status in a behavior module due to an external stimulus, for example.

The Internal-status Manager (ISM) is an object included in the internal-status manager 54. It manages several emotions including instinct and affect in the form of mathematical models. More specifically, it manages the internal status such as the instinct and emotion of the robot 1 on the basis of an external stimulus (ES) recognized by each of the objects in the aforementioned recognition system.

The Situated Behaviors Layer (SBL) is an object included in the situated behaviors layer (SBL) 58. That is, it is an object as a client of the Short-term Memory (=STM)). It periodically has a notification of information about external stimuli (target and event) from the Short-term Memory, and selects a schema, namely, a behavior module to perform. The SBL will be described in detail later.

A Reflexive SBL is included in the reflexive SBL 59, and implements reflexive and direct motions/sounds/leds of the bodily units of the robot 1 in response to an external stimulus recognized by each of the objects included in the aforementioned recognition system. For example, it provides a behavior to instantly evade a obstacle detected.

As above, the Situated Behaviors Layer (SBL) object selects a behavior on the basis of an external stimulus, change of the internal status, etc. On the other hand, the Reflexive. SBL provides a reflexive behavior in response to an external stimulus. Since these two objects select behaviors independently of each other, the robot 1 performs behavior modules (schemata) selected by the objects because of a conflict between hardware resources in the robot 1. On this account, a Resource Manager object is included in the behavior control system 50. This object arbitrates the competition between the hardware sources when the Situated Behaviors Layer and Reflexive SBL select behaviors, respectively. It notifies each object implementing a behavior of a bodily unit of the robot 1 of the result of arbitration, and thus the robot 1 is driven.

In addition, there are provided "Sound Performer", "Motion Controller" and "LED Controller". They are objects which implement actions of bodily units of the robot 1. The Sound Performer object outputs a sound or speech. It synthesizes a sound correspondingly to a text and command supplied from the Situated Behaviors Layer (SBL) via the Resource Manager, and outputs the sound from the speaker on the robot 1. The Motion Controller object activates the actuators $A_2, A_3, \ldots$ of the robot 1. When supplied with a command to move the hand or leg from the Situated Behaviors Layer (SBL) via the Resource Manager, it computes an angle of a corresponding joint. The LED Controller object turns on or off an LED (light-emitting diode). Supplied with a command from the Situated Behaviors Layer (SBL) via the Resource Manager, it turns on or off the LED.

Figure 6:
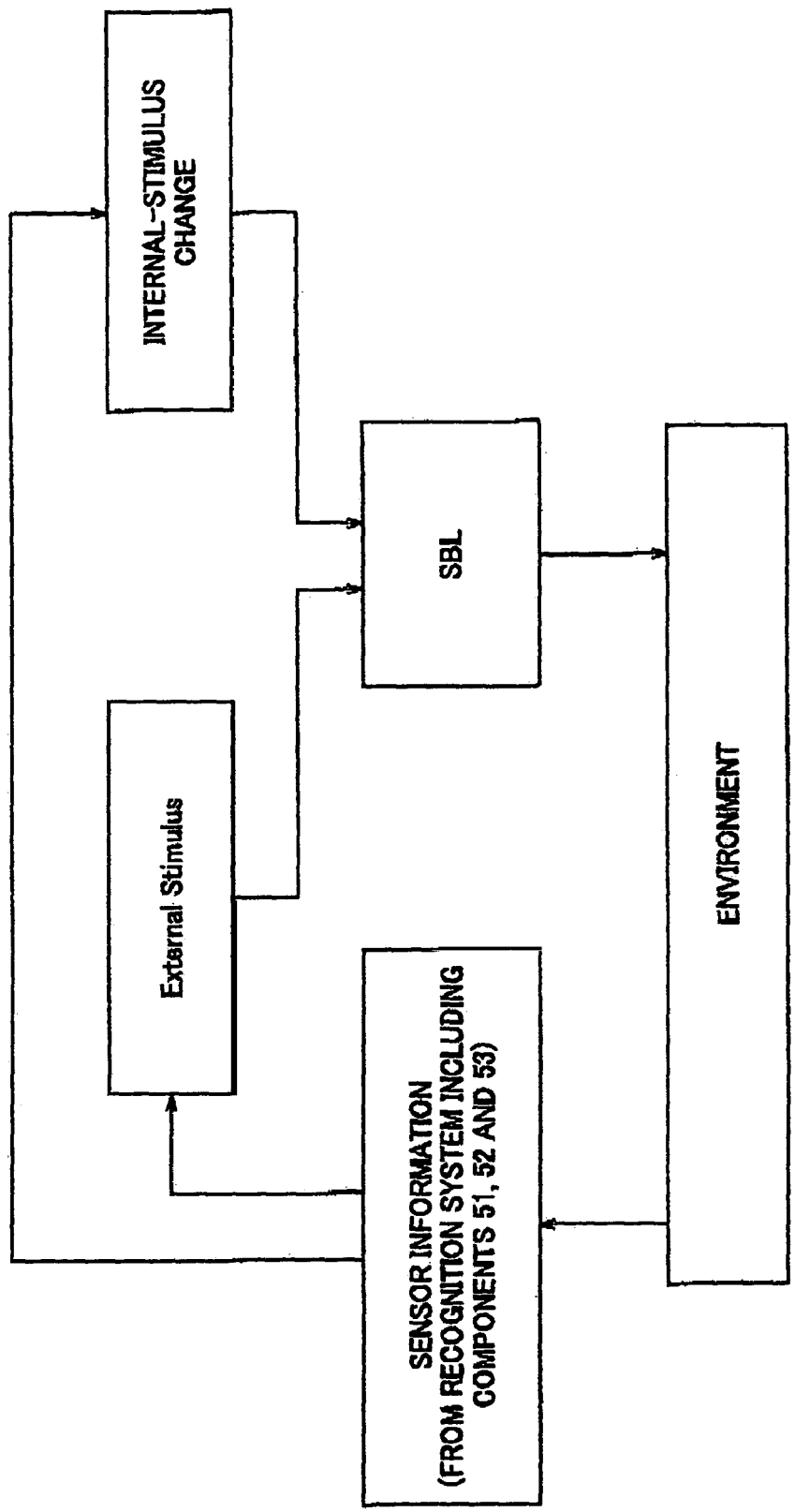
FIG. 6 schematically illustrates a mode of situated behavior control by a situated behaviors layer of the behavior control system.

FIG. 6 schematically illustrates a mode of situated behavior control by the aforementioned situated behaviors layer (SBL) 58 (including the reflexive SBL 59). A result of environment recognition by the recognition system (visual, audio and tactile recognition blocks 51, 52 and 53) is supplied as an external stimulus to the situated behaviors layer (SBL) 58. Also a change of the internal status, corresponding to the result of environment recognition by the recognition system (visual, audio and tactile recognition blocks 51, 52 and 53) is supplied to the situated behaviors layer (SBL) 58. Then, the situated behaviors layer (SBL) 58 can select a due behavior through judging the situation on the basis of an external stimulus and internal-status change.

Figure 7:
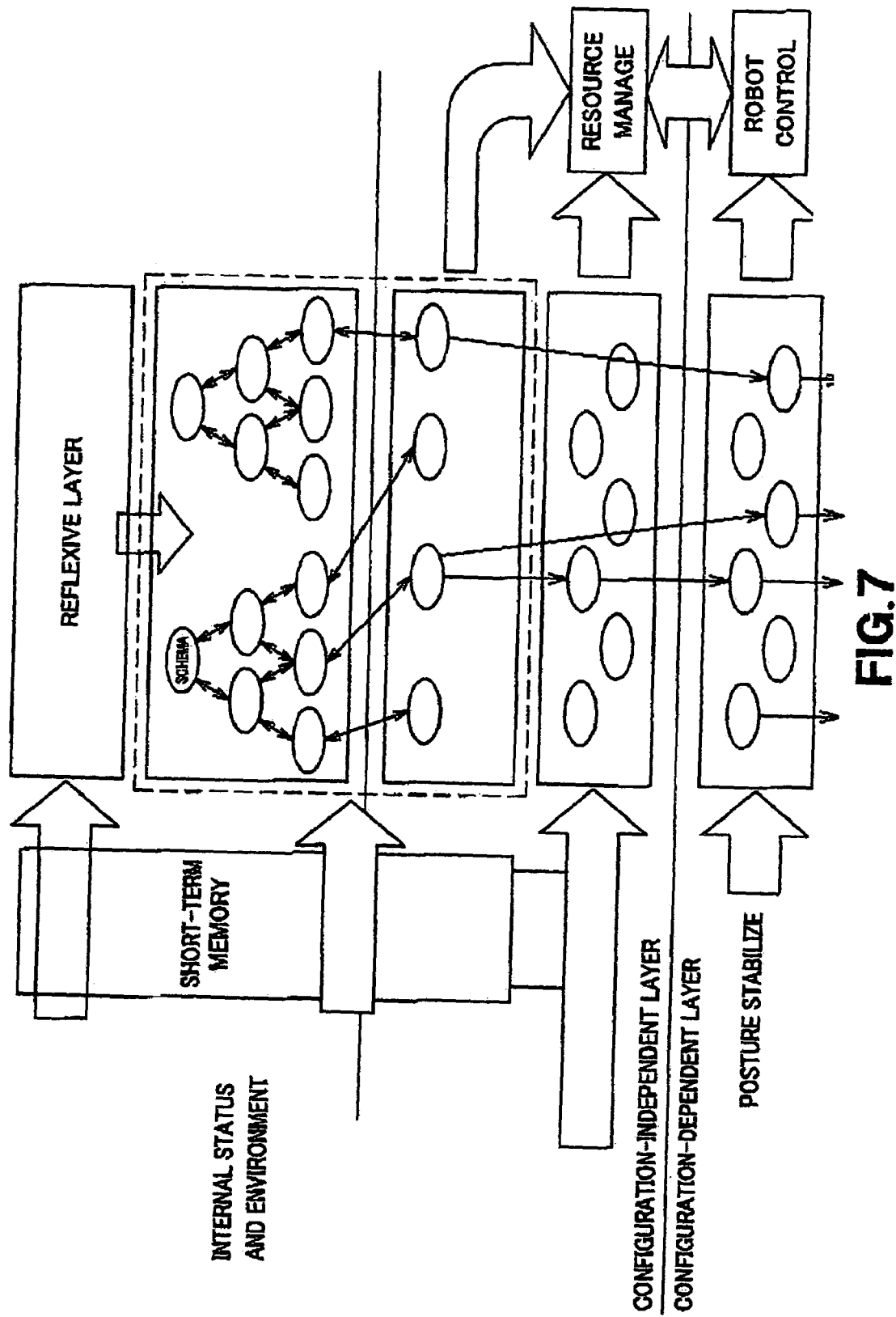
FIG. 7 schematically illustrates the situated behaviors layer composed of a plurality of schemata.

The situated behaviors layer (SBL) 58 has a state machine for each of behavior modules, and categorizes the results of recognition of external stimuli supplied from the sensors depending upon the previous behaviors and situations to have the robot 1 show a behavior. Each of the behavior modules is stated as a schema having a "monitor" function to judge the situation on the basis of an external stimulus and internal status and an "action" function to implement a state transition (state machine) incidental to implementation of a behavior. FIG. 7 schematically illustrates how the situated behaviors layer (SBL) 58 is composed of a plurality of schemata.

The situated behaviors layer (SBL) 58 (more strictly saying, a portion of the situated behaviors layer 58 that controls ordinary situated behaviors) is formed as a tree structure in which the plurality of schemata is hierarchically linked to each other. It totally judges a more optimum schema on the basis of an external stimulus and internal-status change to control a behavior. The tree includes behavior models obtained through mathematization of ethological situated behaviors, for example, and a plurality of sub trees (or branches) such as sub trees for expressing affect.

Supposing interactions, as behaviors of the robot 1, with the user or human being, the tree system of the situated behaviors layer (SBL) 58 is formed herein with reference to human behaviors actually found.

The typical behaviors performed by a person wanting to dialogue with someone are assumed to be a sequence of simple independent ones as follows:

(a) He or she searches a partner (target);
(b) He approaches the partner (target); and
(c) He dialogues with the partner (target).

An example tree structure of the situated behaviors layer (SBL) 58, constructed for implementing the above behaviors, will be described herebelow with reference to FIG. 8.

Figure 8:
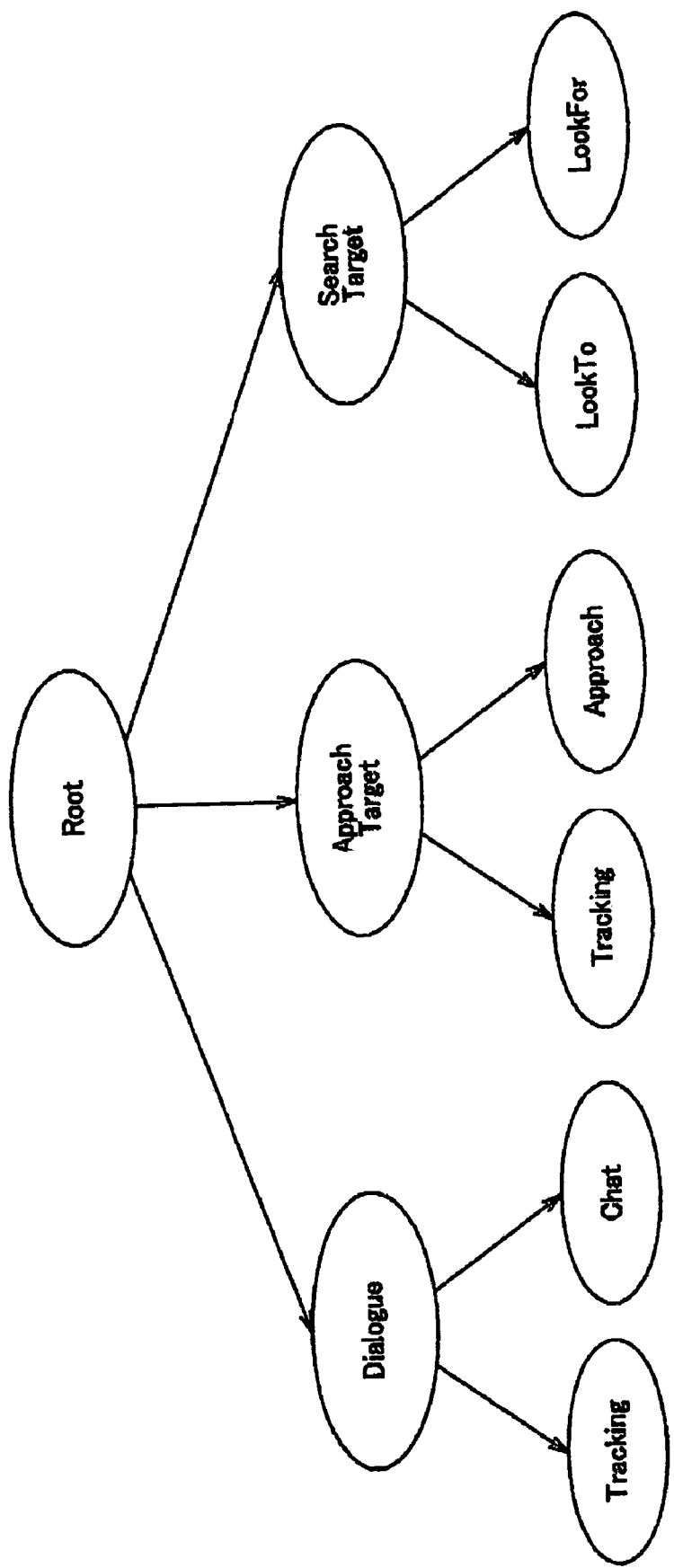
FIG. 8 schematically illustrates a tree structure of the schemata included in the situated behaviors layer.

As shown in FIG. 8, the situated behaviors layer (SBL) 58 is constructed of a "Root" schema located at the top level and at which it is notified of an external stimulus from the short-term memory 55, and other schemata located at levels below the top level. The schemata are disposed in a sequence of categories from abstract to concrete. More specifically, beneath the "Root" schema, there are disposed schemata "Search Target", "Approach Target" and "Dialogue" at the same level. Thus, a behavior algorithm is modeled. Below the Search target schema, there are disposed schemata "Look To" and "Look For" for concrete behaviors to search a target. Similarly, below the Approach Target schema, there are disposed schemata "Tracking" and "Approach" for concrete behaviors to approach the target. Below the Dialogue schema, there are disposed schemata "Tracking" and "Chat" for concrete behaviors to dialogue with the target. It should be noted that a schema may be disposed in a different sub tree as the "Tracking" schema is so.

Each of the schemata in the present invention has a function to implement a behavior uniquely and it is highly independent of the other schemata. Thus, when designing a schema, it is possible to focus on only the feature of a behavior (motion or action) being designed. Also, it is not necessary to give any consideration to any other requirements possibly taking place when the schema actually works in the tree structure. Actually, each schema has a focus as action-related information and can refer to a thing or person in the environment around the robot 1, for example, which will be a specific target when the schema works. There exists minimum necessary information for the schema to perform, and the aforementioned focus is formed from such information. It should be noted that the schemata may have different focuses, respectively.

Since each of the schemata is dependent upon information included in its focus, it is independent of the tree structure in which itself and other schema or schemata are disposed. However, each of the schemata may implement a behavior in collaboration with any other schema or schemata as will further be described later.

For example, the Tracking schema tracks the position of a target or observes the path of the target, and cause the robot 1 to turn the face (head) toward the target. In case the target is a person in the environment around the robot 1, when the Tracking schema is carried out, the robot 1 continuously swings the head unit 3 to the right and left correspondingly to the relative positional relation between itself and target, thereby permitting to keep the head unit 3 in a position it always faces the target rightly. A symbol to identify a target recognized by the visual recognition block 51 in the behavior control system 50 can be used as the focus of the Tracking schema. For example, in case the visual recognition block 51 associates ID information with each recognized thing (or person) or a detected event, the ID information can be used as the focus.

Figure 9:
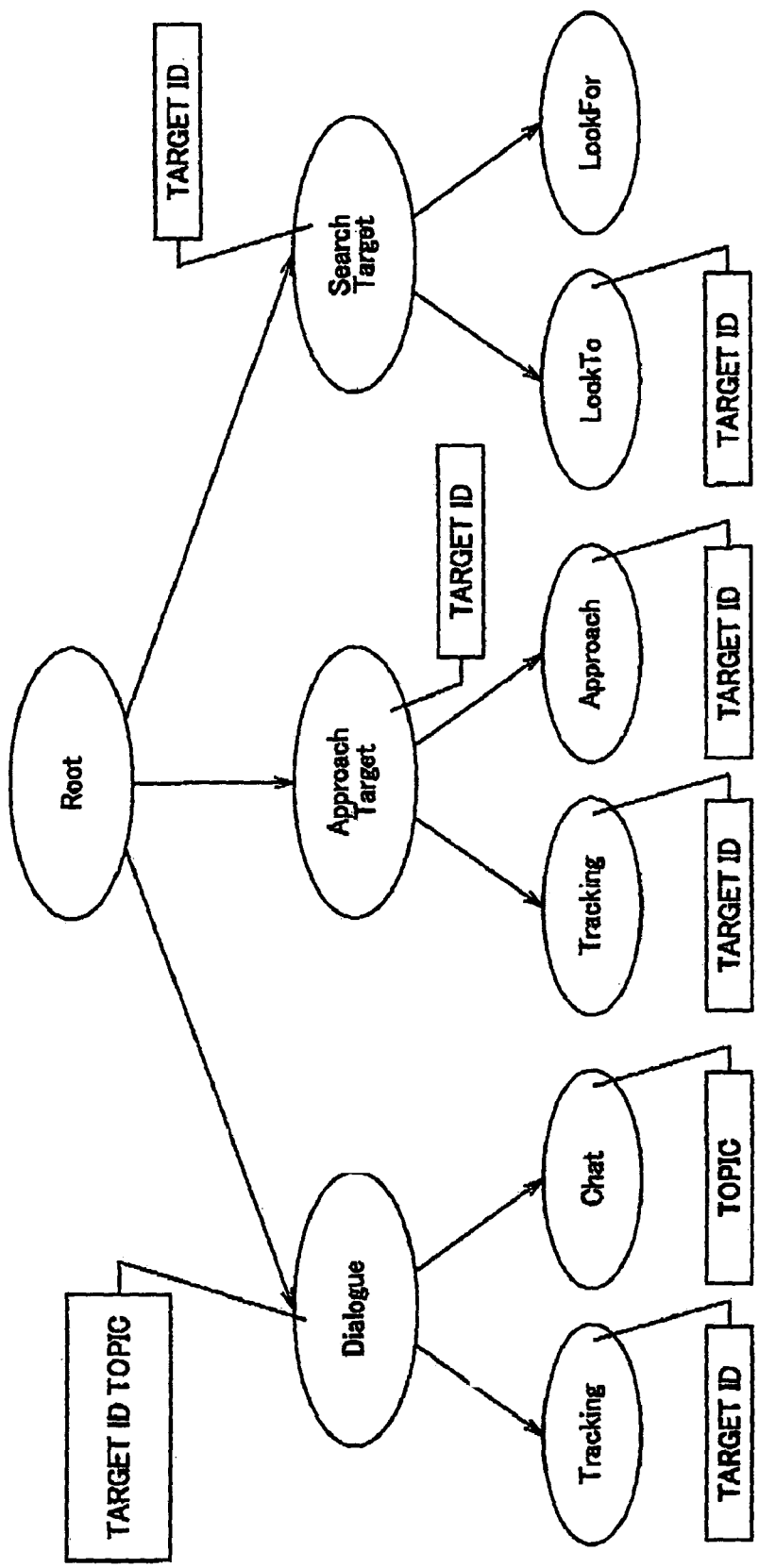
FIG. 9 shows the tree structure having added thereto focus information for each schema.

FIG. 9 shows the tree structure shown in FIG. 8, having added thereto focus information for each schema. In the example shown in FIG. 9, almost all the schemata need no other focus information than ID information (target ID) about a target or a person in the environment around the robot 11 who is the partner in dialogue but only the Dialogue and Chat schemata-need focus information showing the topic of the dialogue. Since the Look For schema needs no specific target, it has no focus. That is, the Look For schema can search any target in the environment around the robot 1.

Figure 10:
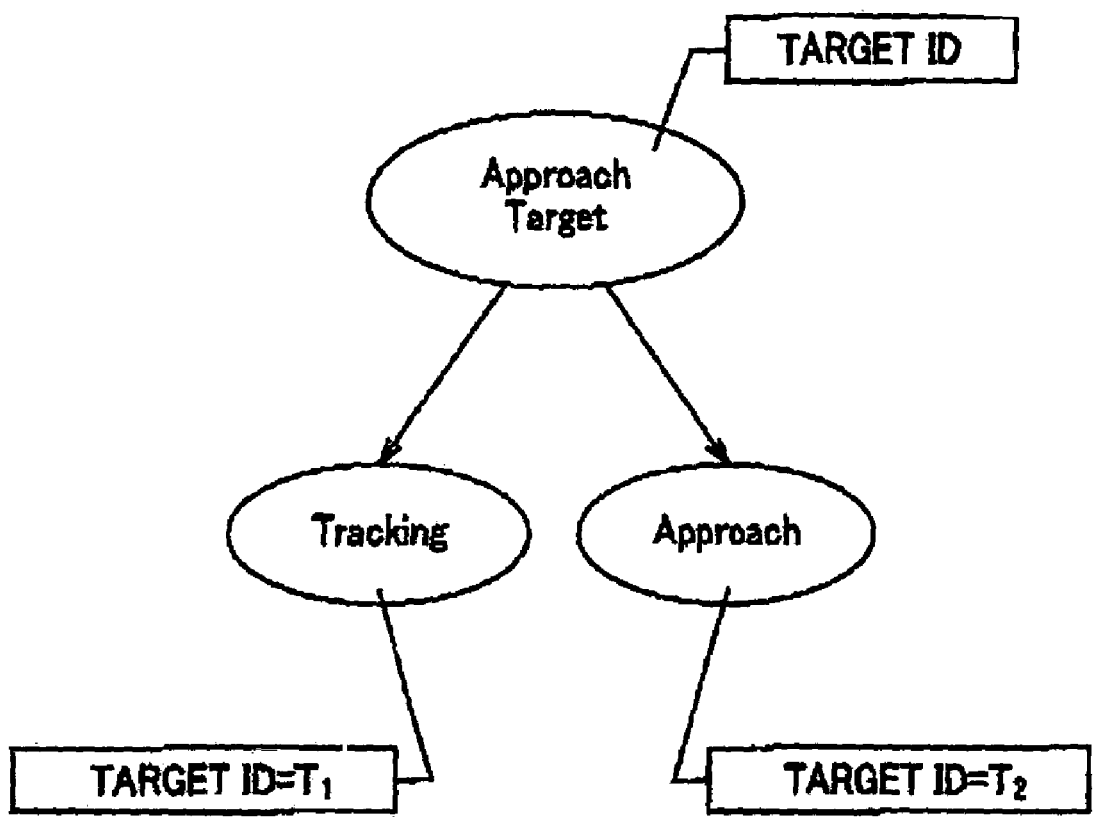
FIG. 10 shows a sub-tree structure of an Approach Target behavior in which Tracking and Approach schemata are focused on different targets, respectively.
Figure 11:
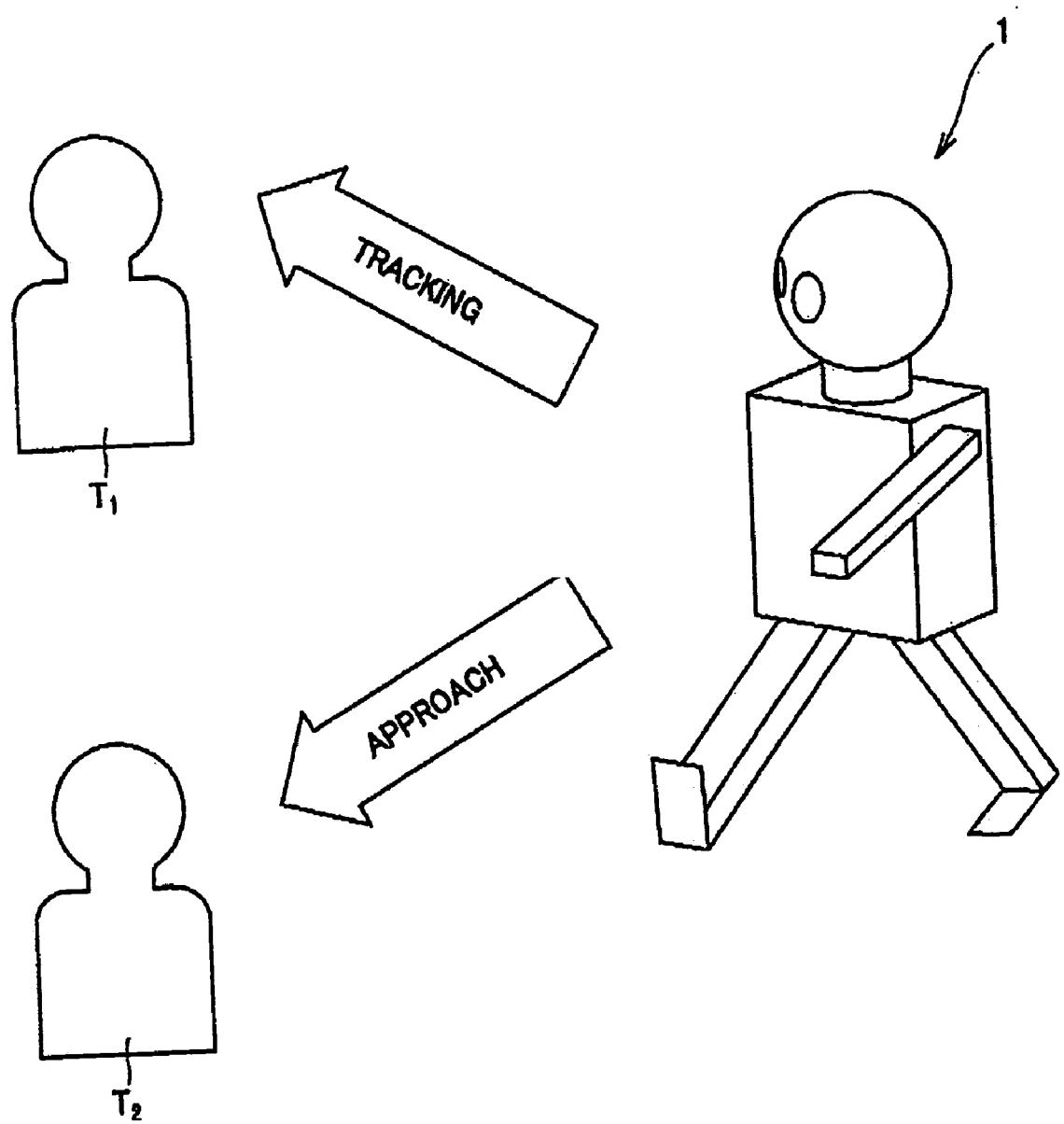
FIG. 11 schematically illustrates behaviors of the robot apparatus when Tracking and Approach schemata are focused on different targets, respectively.

Also, as seen from FIG. 9, there is no restriction by coherence between information pieces included in the focus. In other words, each target ID can deal with different targets (thing or person) in the environment around the robot 1. If there is no such coherence between the information pieces in the focus, a total behavior of the robot 1 will be a simple combination of action implemented by the schemata. For example, in case the low-order (child) Tracking and Approach schemata take different targets $T_1$ and $T_2$ as their foci, for example, in the Approach Target behavior as shown in FIG. 10, the robot 1 will walk toward the target $T_2$ while tracking the target $T_1$ as shown in FIG. 11.

Each schema in the present invention has an interface for transfer of data and control signal between the schemata, and the schemata may be recombined in the tree structure for implementation of a complicated behavior. Also, each schema can have another schema to interact with child schemata, that is, the rest of the tree structure. Such a schema will be referred to as a "parent schema" or "hub schema" hereunder.

Figure 12:
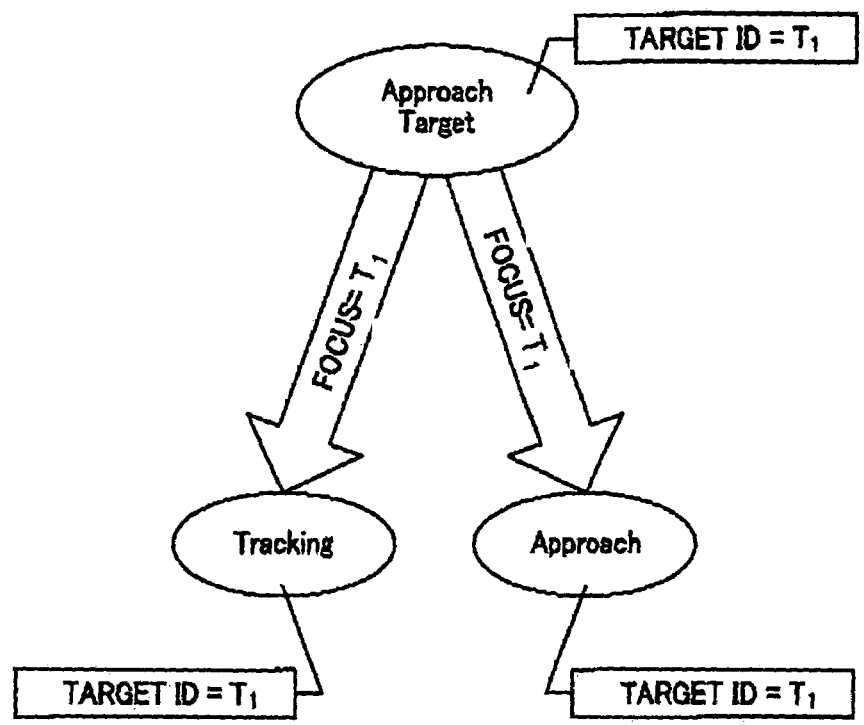
FIG. 12 shows a sub-tree structure of the Approach Target behavior in which the Approach Target schema sets the same focus for the Tracking and Approach schemata.

The parent schema defines a connection pattern in which child schemata are connected or the child schemata to some extent. On the contrary, each of the child schema is only subject to the connection pattern defined by the parent schema, and thus works independently of the parent schema or works under the control of the patent schema. For example, the schemata can exchange focus information between them via their interfaces, and also the Approach target schema, for example, can set a focus for the Tracking schema when the Approach Target schema can control the Tracking schema. In this case, the parent schema monitors the focus the child schemata are looking to, and controls the behaviors implemented by the child schemata, if requested, by setting foci for the child schemata, for example. FIG. 12 shows an example setting of the Target $T_1$ as foci of the Tracking and Approach schemata as the child schemata of the Approach schema as a patent schema.

As above, each schema can be a terminal node, that is, a child schema, and also a hub node, that is, a parent schema. Also, a parent schema can defines a connection pattern in which the child schemata are connected. The connection pattern will be described in detail herebelow.

In the example shown in FIG. 7, a typical pattern in which the child schemata are connected, namely, an instruction pattern, for each sub tree. The connection pattern will be described in sequence.

First, the Search Target schema is a parent schema for the Look For and Look To schemata. These three schemata form together a sub tree of "Search Target" behavior. The Look For schema is to make a behavior of searching (for something). It visually searches the face of a person, for example. The schema uses the head unit 3 of the robot 1 to scan through the environment for searching the face of the person. It should be noted that the schema may of course search any other target such as a thing. The Look To schema controls the robot 1 to turn around in response to a sound (look in the direction of the sound). For example, when a voice is heard, the schema controls the robot 3 to turn the head unit 3 toward the voice. Thus, the Look For and Look To schemata are independent of each other, and can implement a behavior independently of the other schema.

On the other hand, in the sub tree of Search Target behavior, the Search Target schema uses the Look For and Look To schemata as child schemata in order to implement a more complicated behavior. The child schemata work independently of each other without being interfered with (controlled) by the parent schema (Search Target). In other words, in case the sub tree of Search Target behaviors is being executed, the robot 1 is caused by the Look For schema to continuously swing the head unit 3 to the right and left until the face of the person as the target is detected. Then, the robot 1 ceases to swing the head unit 3 so. At the same time, the robot 1 is caused by the Look To schema to turn the head unit 3 toward a voice heard, if any, in the environment around it.

Figure 13:
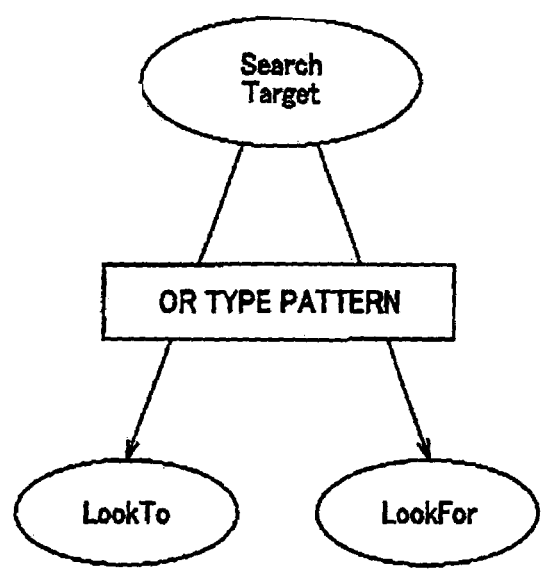
FIG. 13 shows a sub-tree structure of a Search Target behavior in which child schemata are connected in an OR type pattern.

As above, the Search Target schema works not to control the child schemata but as a neutral hub schema. Such a connection pattern is called "OR type pattern" herein. Because of this OR type pattern in which child schemata are connected, an arbitrary child schema can implement a behavior at an arbitrary time without being acted on by any other schema. The sub tree of Search Target behaviors in this case is shown in FIG. 13.

Note that according to the present invention, it is possible to implement the above-mentioned complicated behavior as compared with a simple behavior by one schema only by defining a pattern in which the child schemata are connected without recombining the schemata adaptively to any specific situation.

The Approach Target schema is a parent schema of the Tracking and Approach schemata. These three schemata form together a sub tree of "Approach Target" behavior. The Tracking schema is to track the position of a target or observe the moving path of the target, and cause the robot 1 to turn the face (head unit) toward the target. The Approach schema is a schema which causes the robot 1 to walk toward the target. When the target is a person existing in the environment around the robot 1 for example, the Approach schema causes the robot 1 to walk toward the person to within a predetermined distance from the person. Thus, the Tracking and Approach schemata are independent of each other, and can implement a behavior independently of the other schemata.

In the sub tree of Approach Target behavior, however, the Approach Target schema uses the Tracking and Approach schemata as child schemata to implement a more complicated behavior. Especially, the Approach Target schema checks whether the child schemata work consistently with each other to assure that:

(a) All the child schemata work in collaboration with each other and
 (b) All the child schemata have the same focus, for example, the same target.

In other words, when the sub tree of Approach Target behaviors is executed and the target is a person in the environment around the robot 1, for example, the robot 1 is caused by the Tracking schema to continuously swing the head unit 3 to the right and left correspondingly to the relative positional relation between itself and target and behaviors of the person and itself, thereby permitting to keep the head unit 3 in a position it always faces the target rightly. At the same time, the robot 1 is caused by the Approach schema to walk toward the person.

Figure 14:
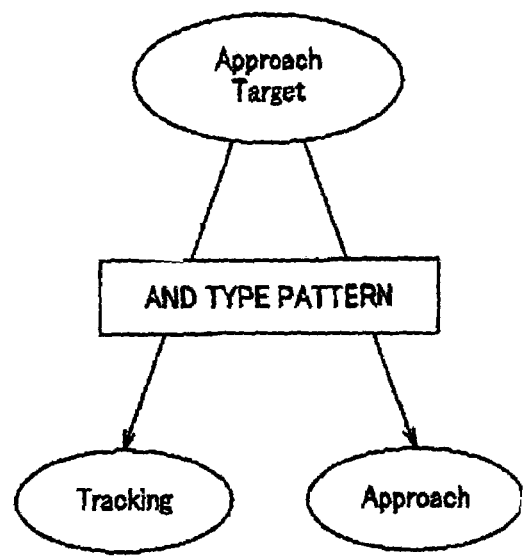
FIG. 14 shows a tree-structure of the Approach Target behavior in which child schemata are connected in an AND type pattern.

The Approach Target schema controls the child schemata as above. Such a connection pattern is referred to as "AND type pattern" herein. In this AND type pattern of connection, all the child schemata work in collaboration with each other. The sub tree of Approach Target behaviors in this case is shown in FIG. 14.

Note that according to the present invention, it is possible to implement the above-mentioned complicated behavior as compared with a simple behavior by one schema only by defining a pattern in which the child schemata are connected without recombining the schemata adaptively to any specific situation.

Figure 15:
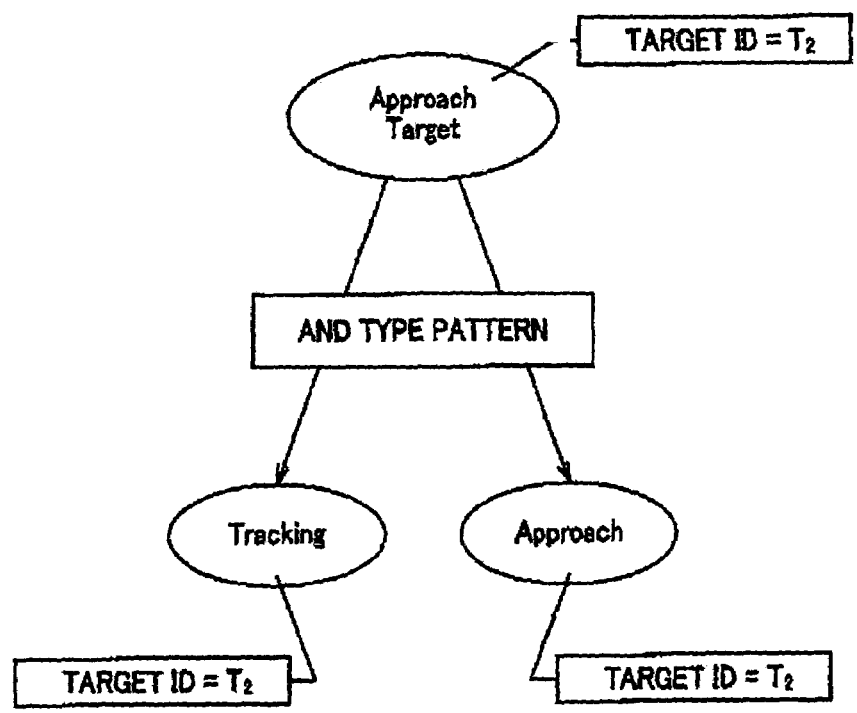
FIG. 15 shows a sub-tree structure of the Approach Target behavior in which the Approach Target schema sets the same focus for the child schemata.
Figure 16:
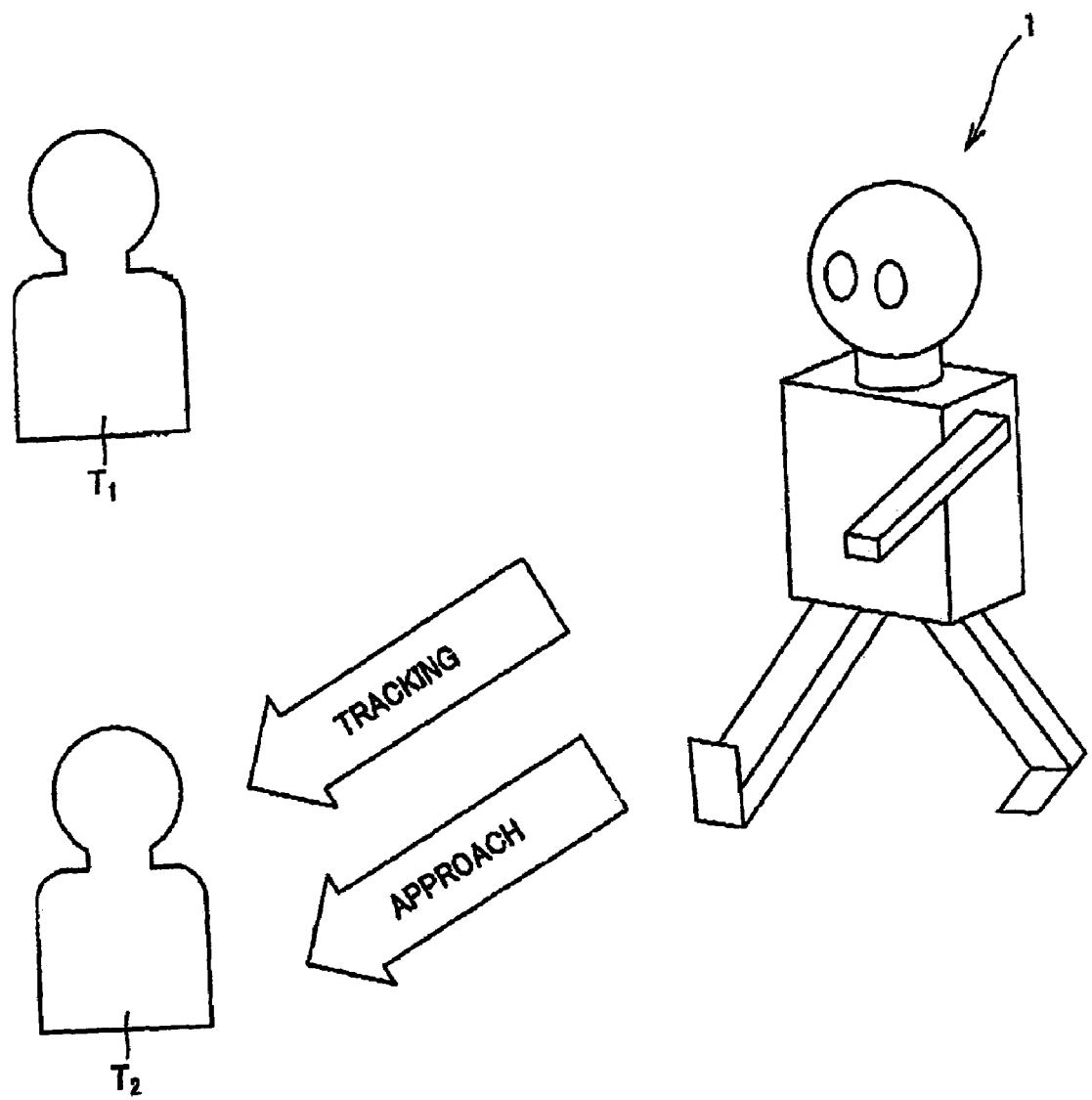
FIG. 16 schematically illustrates a behavior of the robot apparatus when the Approach Target schema sets the same focus for the child schemata.

Also, in the sub tree of Approach Target behavior, all the child schemata connected in the AND type pattern have the same focus. FIG. 15 shows an example setting of a target $T_2$ as the focus of the Tracking and Approach schemata being child schemata by the Approach target schema being the parent schema of these child schemata. In this case, the robot 1 shows a behavior of walking toward the target $T_2$ while tracking the target $T_2$ as shown in FIG. 16.

The Dialogue schema is the parent schema of the Tracking and Chat schemata. These three schemata form together a sub tree of Dialogue behaviors. The pattern in which the child schemata in the sub tree of Dialog behaviors are connected is of the AND type and the sub tree itself is similar to that of the Approach Target. So, the Dialogue behavior sub tree will not be explained any longer.

As above, the illustrated example is a simulation of a person wanting to dialogue with some one. The behavior of the robot 1 is implemented by sub trees of Search Target behaviors, Approach Target behaviors and Dialogue behaviors. This complicated behavior should include connection patterns that can be performed successively. More specifically, when the robot 1 goes to have a dialogue with a person, the person should be within a predetermined reach of the robot 1. To be near the person, the robot 1 has to approach the person. The person should be within the environment around the robot 1, and the robot 1 has to search (look for) the person. In other words, the behaviors performed by a person wanting to dialogue with someone are stated a sequence of simple independent ones as follows:

(a) He or she searches a partner (target);
(b) He approaches the partner (target); and
(c) He dialogues with the partner (target).

Figure 17:
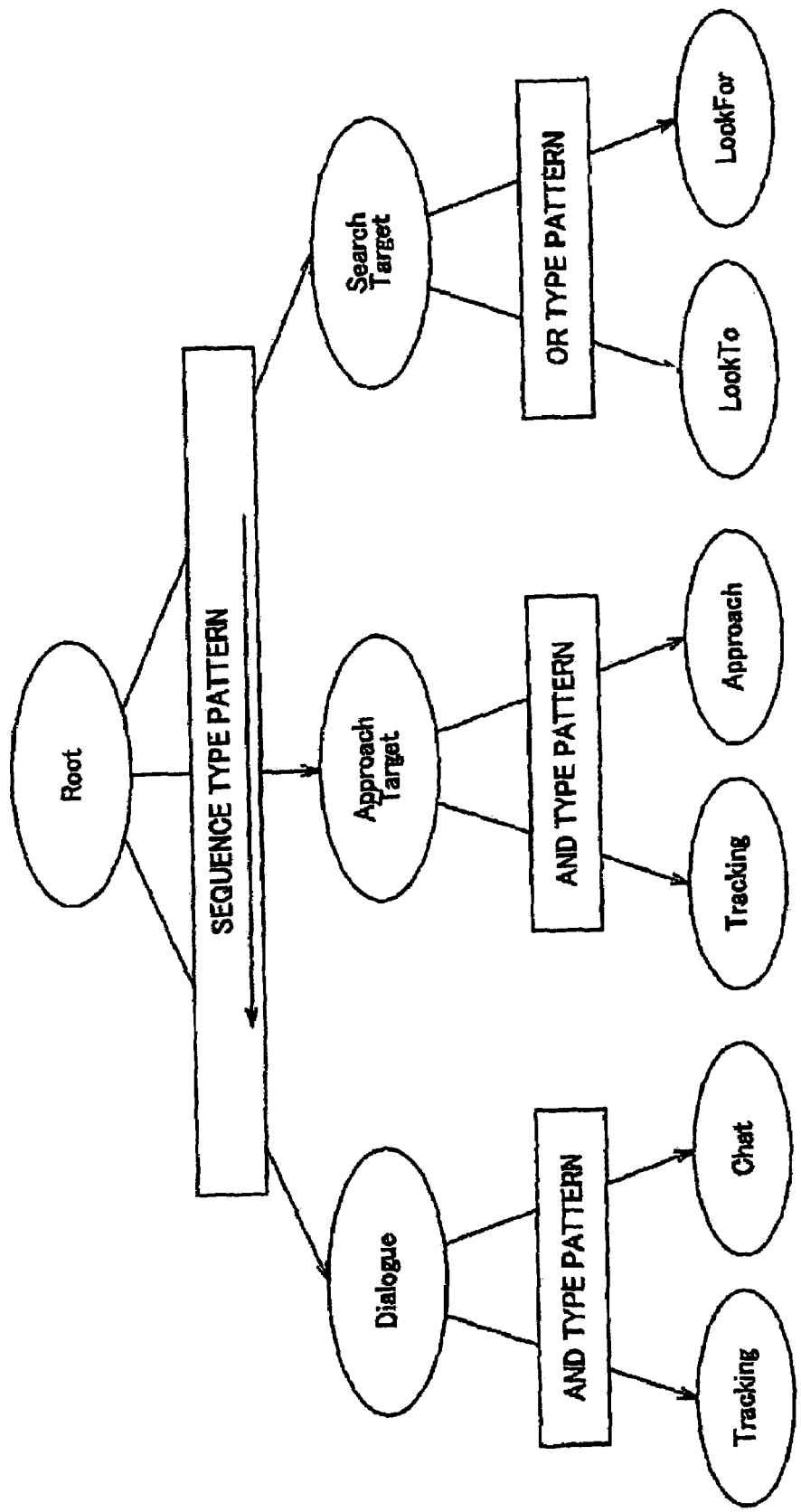
FIG. 17 shows a tree structure in which the Search Target schema, Approach Target schema and a Dialogue schema are connected in a SEQUENCE type pattern.

The above connection pattern is referred to as "SEQUENCE type pattern" herein. A tree structure of all these behaviors is shown in FIG. 17. With this SEQUENCE type pattern, the robot 1 can start a behavior at any of different time points corresponding to the current situation. For example, when a person with which the robot 1 is going to have a dialogue is near the robot 1, the Approach Target behaviors can be omitted.

Note that the connection patterns such as the OR, AND and SEQUENCE type patterns are referred to herein just by way of example and the present invention is not limited such connection patterns.

A schema may be a terminal node in a tree structure while being a hub node in another tree structure. The interface of the schema sends information such as data and control signal from the schema to automatically accommodate different situations.

Each of the schemata may be designed to detect child schemata, if any, and define a specific control pattern for the child schemata, or designed as a "pure" terminal node. In the latter case, when the child schemata are disposed, a default control pattern, for example, OR type pattern, is used.

A sub tree of Approach Target behaviors is taken as an example for explanation of how an Approach schema is used as a hub schema in the tree structure. As mentioned above, the Approach schema is a one which controls the robot 1 to walk toward a target until the target, for example, a person in the environment is within a predetermined distance from the robot 1. In such a behavior, however, since no consideration is given to any obstacle on the path to the target, the robot 1 will possibly collide with the obstacle, disabling the robot 1 from arriving at the target.

Figure 18:
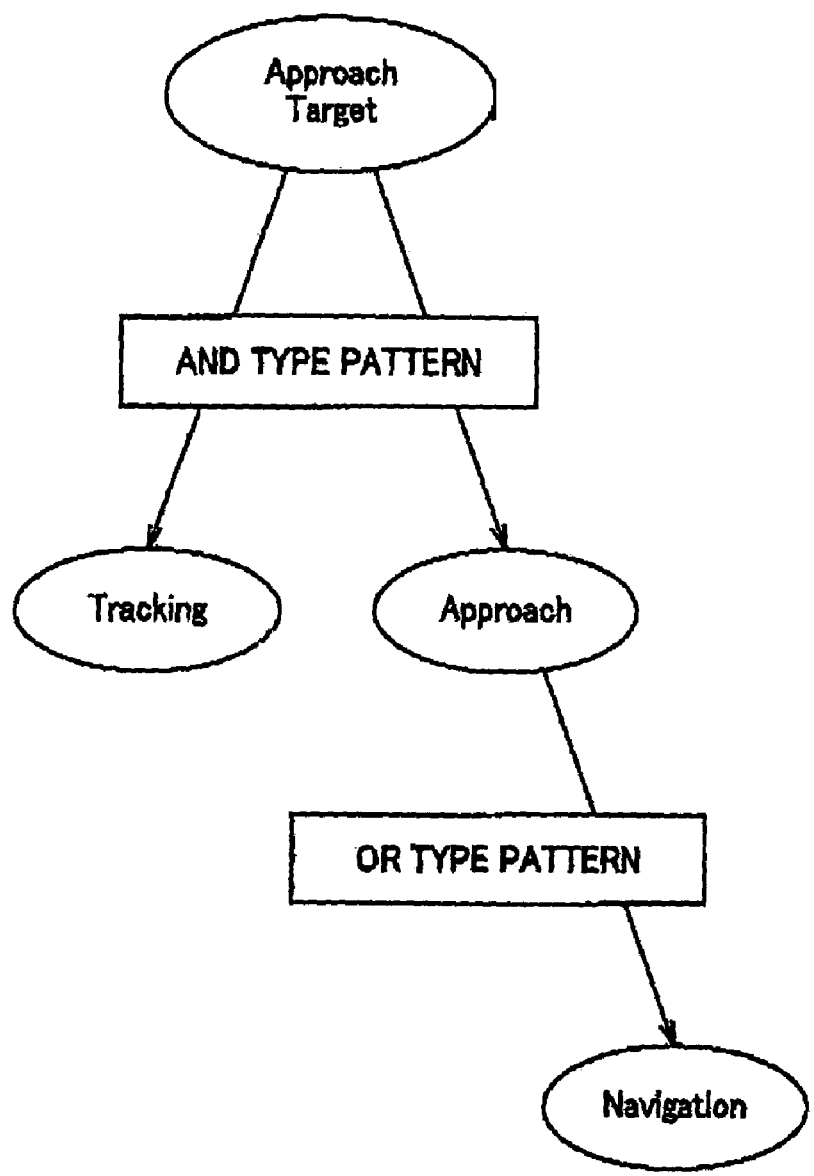
FIG. 18 shows a sub-tree structure of the Approach Target behavior in which a Navigation schema is disposed subordinately to the Approach schema.
Figure 19:
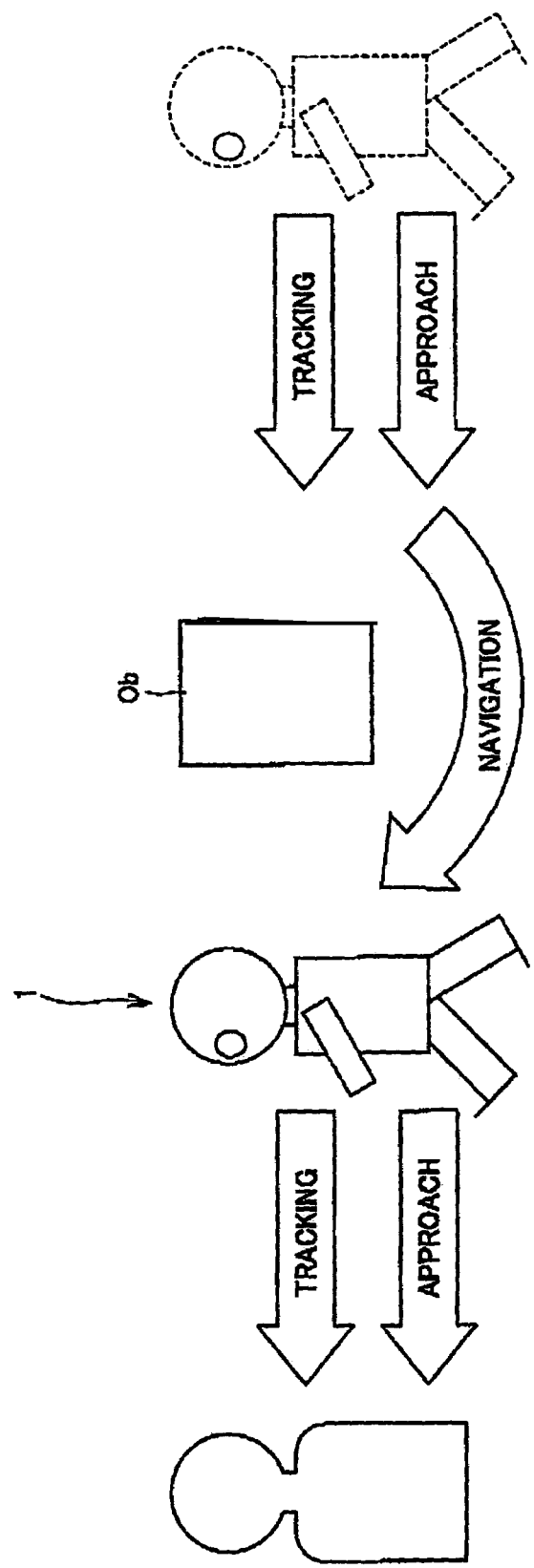
FIG. 19 schematically illustrates a behavior of the robot apparatus when the Navigation schema is disposed subordinately to the Approach schema.

On this account, a Navigation schema to have the robot 1 evade an obstacle may be included in the behavior control system 50 to improve the performance of the robot 1. The Navigation schema is to navigate the direction in which the robot 1 moves. It checks whether there exists any obstacle in a direction in which the robot 1 moves, and if it has detected an obstacle, it indicates an alternative path, for example, a path evading the obstacle. The Navigation schema may be disposed as a child schema of the Approach schema without having to re-design the Approach schema. Just with the Navigation schema connected in a default control panel, for example, in the OR type pattern, by the Approach schema, the Approach and Navigation schemata can work in collaboration with each other. FIG. 18 shows a sub tree of Approach Target behaviors in this case. As a result, the robot 1 is caused by the Tracking schema to track a specific person while it is caused by the Approach schema to walk toward the person, as shown in FIG. 19. If an obstacle Ob is detected, the robot 1 is caused by the Navigation schema to evade the obstacle Ob, for example.

As having previously been described, the situated behaviors layer (SBL) 58 in the present invention is formed to have a tree structure in which a plurality of schemata is connected hierarchically to each other so that the schemata are highly independent of each other to uniquely perform a behavior. Thus, the tree structure can be recombined easily. With such a recombination, the parent schema can define a connection pattern for child schemata such as OR, AND or SEQUENCE type pattern for implementation of a variety of behavior patterns.

Also, since the schemata are highly independent of each other, a new child schema can be added without having to rewrite the schemata, whereby a new action or function can be added to the robot 1.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

Although the embodiment of the present invention has been described concerning the bipedal walking robot in the foregoing, the present invention is applicable to a robot which acts adaptively to the environment and internal status. Namely, the present invention is not limited to any bipedal walking robots and other legged robots.

What is claimed is:

1. A robot apparatus comprising:
    means for recognizing the environment around the robot apparatus;
    means for managing an internal status of the robot apparatus according to the recognized environment and/or a behavior of the robot apparatus;
    a plurality of performing means for performing behaviors of the robot apparatus according to the environment and/or internal status, each of the behaviors being performed respectively, wherein the plurality of performing means are constructed by tree-structure according to levels of the behaviors of the robot apparatus, and lower-order ones of the performing means in the tree-structure perform behaviors of the robot apparatus based on behavior information which is set by higher-order ones of the performing means in the tree-structure where the lower-order ones of the performing means are connected; and means for creating a long term plan of behaviors based on stored contents of a short term memory and a long term memory.

2. The apparatus as set forth in claim 1, wherein the behavior information includes information about targets of the behaviors.

3. The apparatus as set forth in claim 1, wherein the behavior information is what the behaviors are.

4. The apparatus as set forth in claim 1, wherein the plurality of performing means can have lowerorder ones of the performing means connected thereto.

5. A robot apparatus comprising:

means for recognizing the environment around the robot apparatus;

means for managing an internal status of the robot apparatus according to the recognized environment and/or a behavior of the robot apparatus;

a plurality of performing means for performing behaviors of the robot apparatus according to the environment and/or internal status, each of the behaviors being performed respectively, wherein the plurality of performing means are constructed by tree-structure according to levels of the behaviors of the robot apparatus, higher-order ones of the performing means in the tree-structure are able to set a connection pattern of lower-order ones of the performing means in the tree-structure, and the lower-order ones of the performing means perform behaviors according to, the connection pattern; and means for creating a long term plan of behaviors based on stored contents of a short term memory and a lone term memory.

6. The apparatus as set forth in claim 5, wherein the connection pattern indicates a behavior sequence of the plurality of lower-order ones of the performing means.

7. The apparatus as set forth in claim 5, wherein the connection pattern indicates that the plurality of lower-order ones of the performing means are caused to move simultaneously.

8. The apparatus as set forth in claim 5, wherein the connection pattern indicates that each of the lower-order ones of the performing means performs behaviors respectively.

9. The apparatus as set forth in claim 5, wherein the plurality of performing means can have lower-order ones of the performing means connected thereto.

10. A behavior controlling method for a robot apparatus, the method comprising:

performing behaviors of the robot apparatus according to recognized environment around the robot apparatus, and/or an internal status of the robot apparatus according to the recognized environment and/or a behavior of the robot apparatus, wherein a plurality of performing modules are constructed by tree-structure according to levels of the behaviors of the robot apparatus, and lower-order ones of the performing modules in the tree-structure perform behaviors of the robot apparatus based on behavior information which is set by higher-order ones of the performing modules in the tree-structure where the lower-order ones of the performing modules are connected; and creating a long term plan of behaviors based on stored contents of a short term memory and a long term memory.

11. The method as set forth in claim 10, wherein the behavior information includes information about targets of the behaviors.

12. The method as set forth in claim 10, wherein the behavior information is what the behaviors are.

13. The method as set forth in claim 10, wherein the plurality of performing modules can have lower-order ones of the performing modules connected thereto.

14. A behavior controlling method for a robot apparatus, the method comprising:

performing behaviors of the robot apparatus according to recognized environment around the robot apparatus, and/or an internal status of the robot apparatus according to the recognized environment and/or a behavior of the robot apparatus, wherein a plurality of performing modules are constructed by tree-structure according to levels of the behaviors of the robot apparatus, higher-order ones of the performing modules in the tree-structure are able to set a connection pattern of lower-order ones of the performing modules in the tree-structure, and the lower-order ones of the performing modules perform behaviors according to the connection pattern; and creating a long term plan of behaviors based on stored contents of a short term memory and a long term memory.

15. The method as set forth in claim 14, wherein the connection pattern indicates a behavior sequence of the plurality of lower-order ones of the performing modules.

16. The method as set forth in claim 14, wherein the connection pattern indicates that the plurality of lower-order ones of the performing modules are caused to move simultaneously.

17. The method as set forth in claim 14, wherein the connection pattern indicates that each of the lower-order ones of the performing modules performs behaviors respectively.

18. The method as set forth in claim 14, wherein the plurality of performing modules can have lower-order ones of the performing modules connected thereto.

* * * * *